Figure 1:
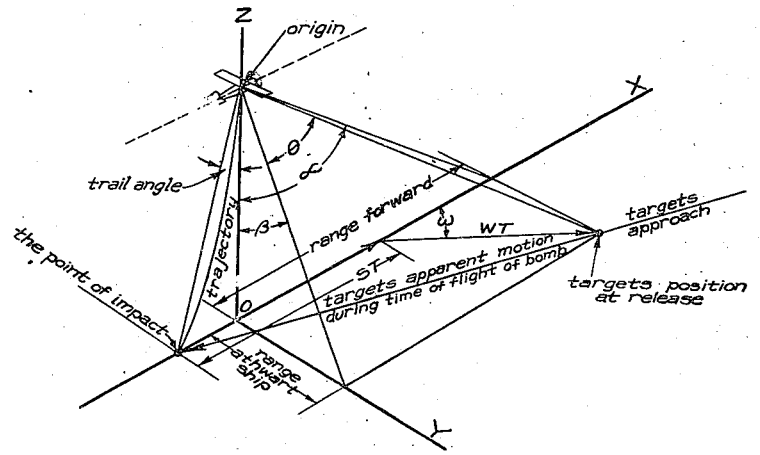

Sept. 24, 1946.　　　W. W. WILLARD　　　2,408,356
SIGHTING MECHANISM
Filed March 20, 1931　　　4 Sheets-Sheet 1

Inventor:
Waldo W. Willard,
by Charles E. Tullar
His Attorney.

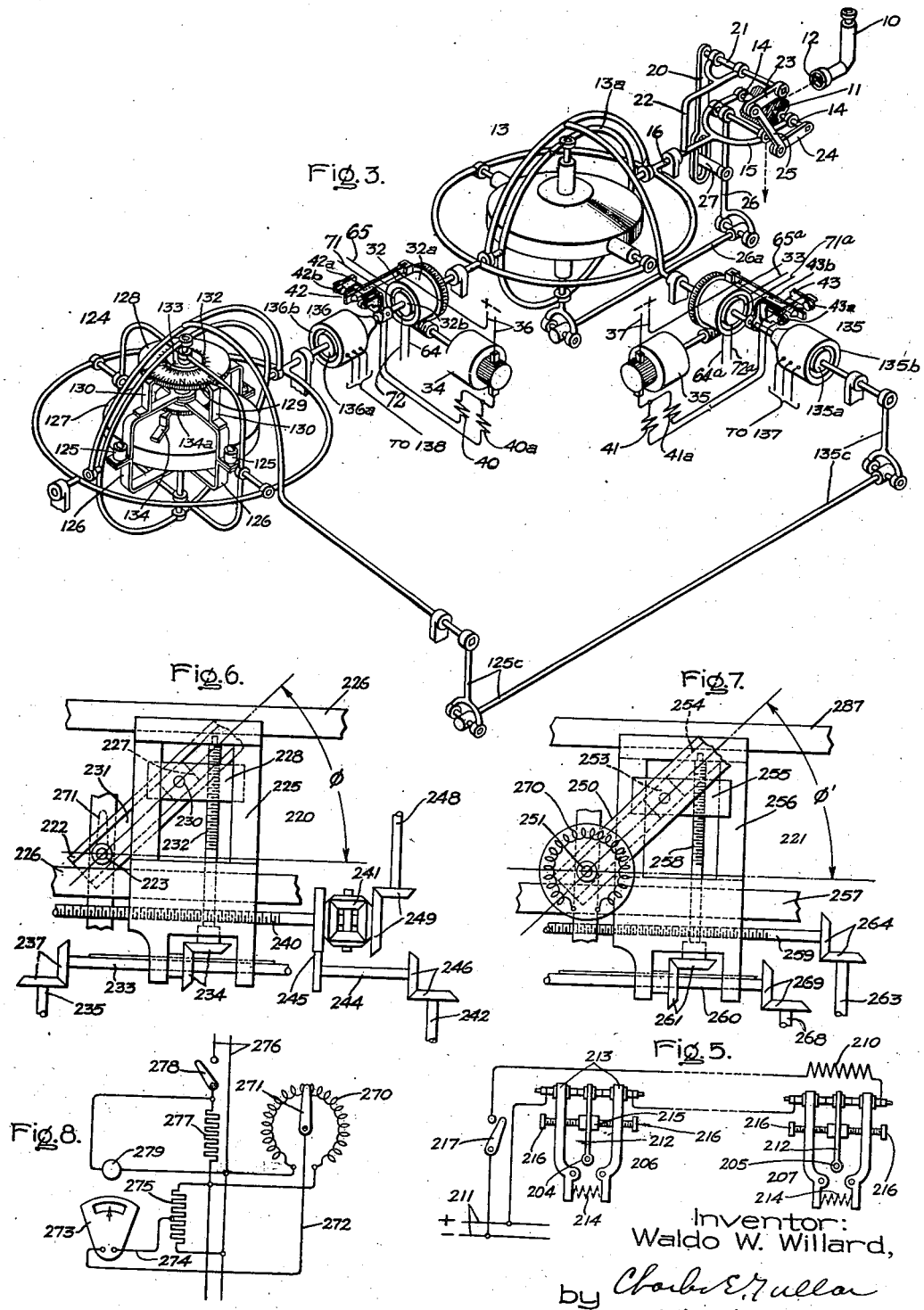

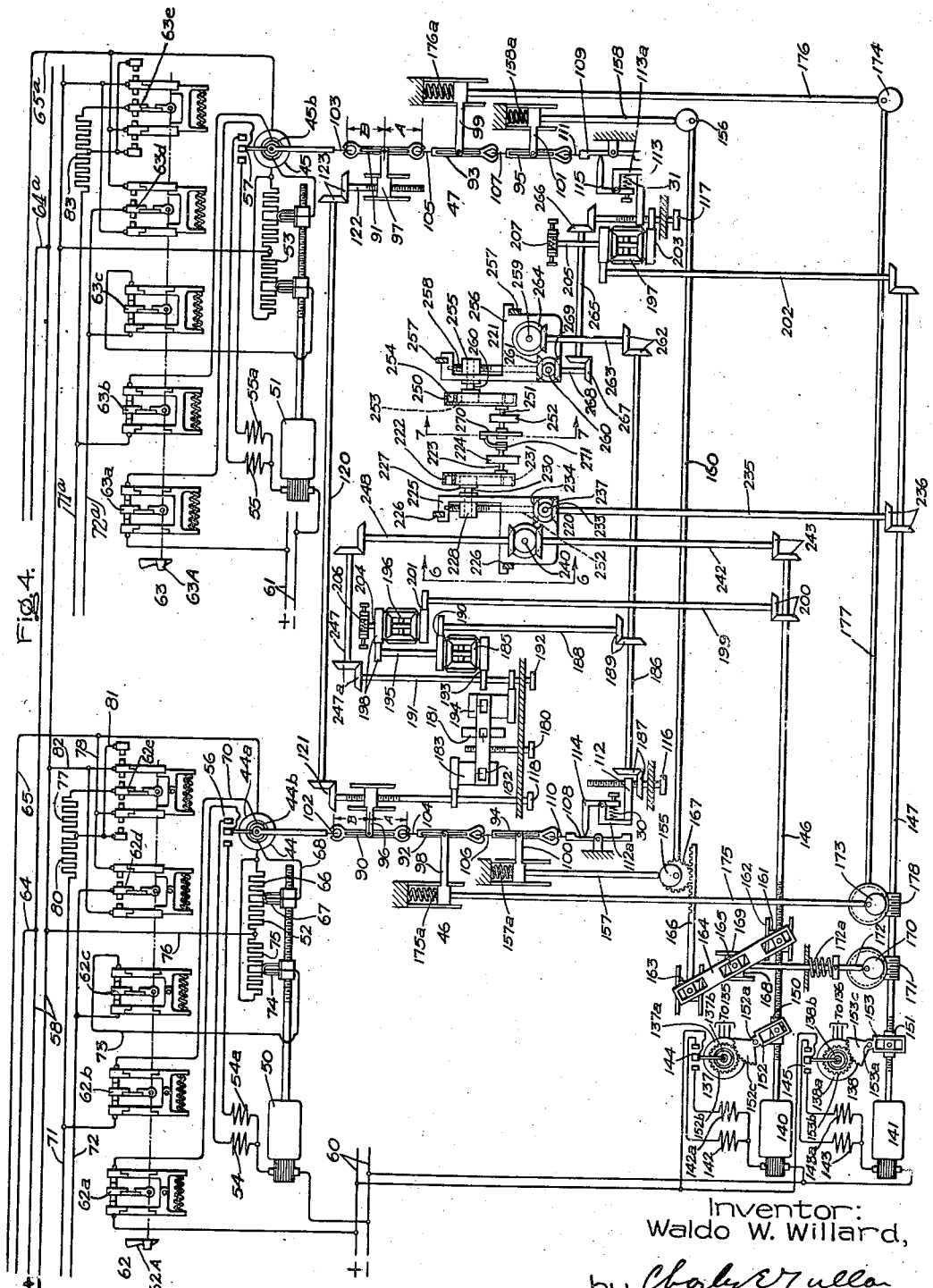

Sept. 24, 1946.　　　W. W. WILLARD　　　2,408,356
SIGHTING MECHANISM
Filed March 20, 1931　　　4 Sheets-Sheet 4
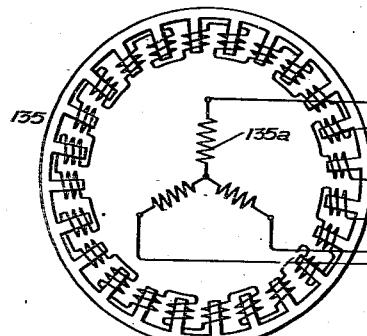
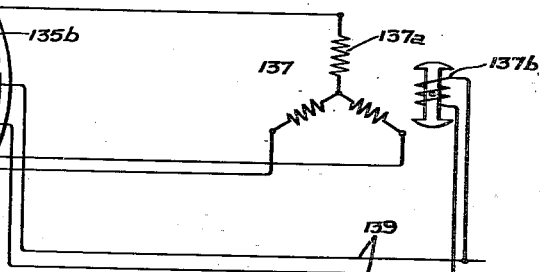
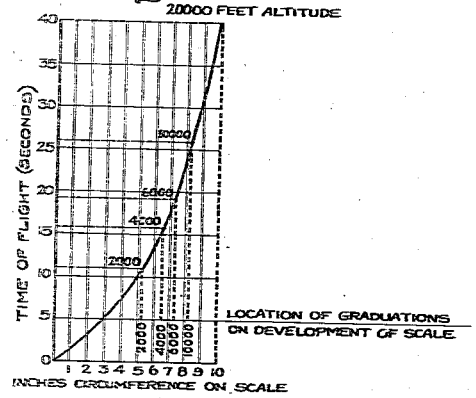
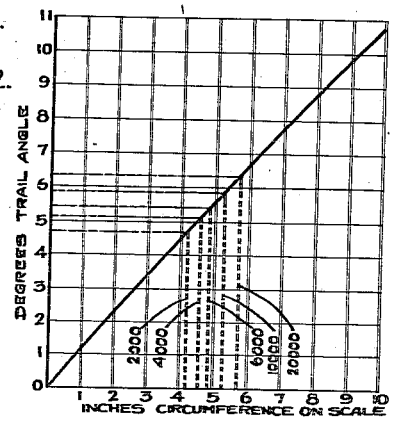
Inventor:
Waldo W. Willard,
by His Attorney.

Patented Sept. 24, 1946

2,408,356

UNITED STATES PATENT OFFICE 2,408,356

SIGHTING MECHANISM

Waldo W. Willard, Schenectady, N. Y., assignor to General Electric Company, a corporation of New York Application March 20, 1931, Serial No. 524,193

57 Claims. (Cl. 33—46.5)

My invention relates to sighting mechanism and the like, more particularly to sighting mechanism for directing a projectile on a target, for example in the control of guns, bombing apparatus, etc., and has for its object the provision of an improved mechanism of this character.

My invention has special application to sighting mechanism for controlling the dropping of bombs from airplanes or other aircraft, and a further object is the provision of reliable and accurate means for directing the pilot to steer the attacking airplane to take a collision course, i. e., such a course with respect to a target or like object that a hit will be secured upon the release of a bomb from the airplane at the proper instant of time; and further, for determining the proper instant of time at which the bomb should be released in order that the bomb will arrive at the same point as the target at the same instant of time and thereby score a hit.

In one of its aspects, my invention contemplates the provision of sighting mechanism which will measure continuously the apparent linear speed of the target, and also the apparent relative direction of its course; and which with the knowledge thus obtained and with the known data with respect to the altitude and the air speed of the attacking airplane will direct the pilot as to how he must steer the attacking airplane so as to arrive at a collision course; and furthermore, determine the proper time for releasing the bomb so that a hit may be scored.

In carrying out my invention in one form, I provide mechanism in which certain known quantities are introduced and which thereafter operates to compute the collision course and the correct point in this course at which the bomb must be released to score a hit. In its simplest aspects the mechanism comprises a sighting device together with means for continuously moving the sighting device so as to maintain it on the target and thereby generate the apparent linear speed and relative direction of movement of the target and apply these quantities to the associated mechanism. The altitude and air speed of the attacking airplane as determined by suitable devices are also introduced into the mechanism. A course indicator for the pilot of the airplane is provided, this indicator being operated automatically by the apparatus so as to indicate a collision course. In its operation, the mechanism is adjusted to move the sighting device continuously with the target, the altitude and air speed having been introduced, and the pilot directs the airplane on a collision course as shown by his indicator. Thereafter the mechanism operates automatically to give a signal or to release the bomb when the airplane reaches a position from which a hit can be made.

More specifically, in one form of my invention I provide a suitable gyroscope connected so that by its precession it will move the sighting device about predetermined axes, as for example, the fore and aft axis of the airplane and another at right angles thereto, the latter lying generally athwartship. In order to maintain the sighting device on the target, I provide suitable means for applying to the gyroscope a measured torque controlling the precession of the gyroscope so that the rate of precession is such as to maintain the sighting device on the target.

I have further provided suitable means for measuring the range angle of the bomb, preferably in terms of its fore and aft and athwartship angular coordinates, and for measuring continuously, as the battle action progresses, the angular position of the target with respect to the airplane, preferably in terms of its fore and aft and athwartship angular coordinates, and for comparing continuously these measured coordinates with the corresponding measured coordinates of the range angle of the bomb. It will be observed that when these former angular coordinates have by the progress of the battle action become equal to the latter each to each at the same instant of time, it is the proper time to effect the release of the bomb. Suitable means is provided for effecting the automatic release of the bomb when this condition exists, or if desired, a suitable signal can be given that the proper time for release of the bomb has arrived.

The pilot directing mechanism whereby the pilot will be instructed as to how he must steer the airplane in order to arrive at and stay on a collision course so that a hit may be scored in one form of my invention comprises suitable means for measuring continuously, as the battle action progresses, the instantaneous magnitudes of the bearing of the target with reference to a predetermined axis, which preferably will be the fore and aft axis, and further, suitable means for measuring the instantaneous magnitudes of the direction angle of the apparent course of the target with respect to this predetermined axis. The instantaneous magnitudes of the bearing and of the direction angle are continuously compared during the course of the battle action and their oustanding differences indicated to the pilot.

Figure 2:
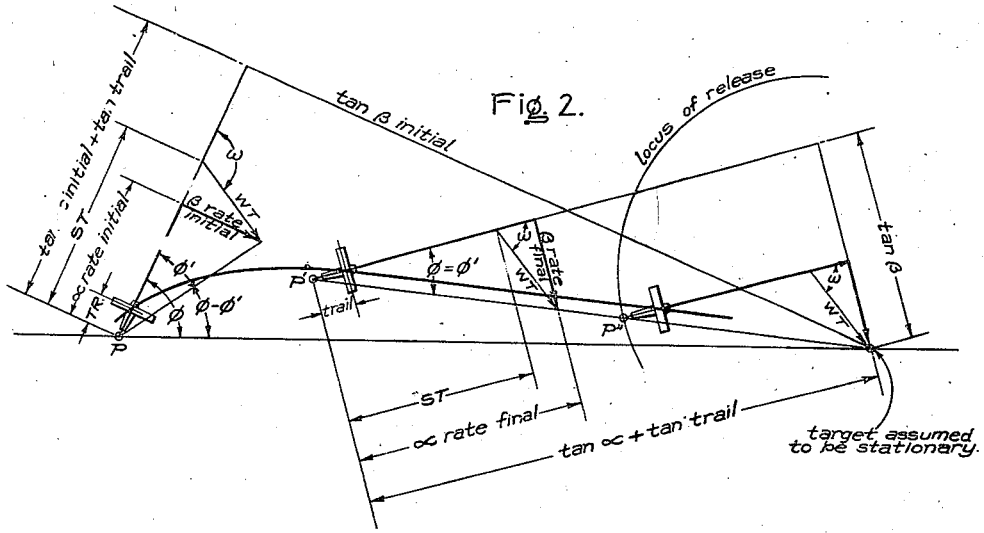

For a more complete understanding of my invention reference should be had to the accompanying drawings in which Fig. 1 is a diagrammatic perspective view illustrating the attacking airplane and the field of action, it being assumed that the airplane is the reference point, and being the reference point, has no motion in the system of coordinates chosen but that the target has all of the motion it seems to have when viewed from the airplane, and illustrating the various elements of the bombing problem shown quantitatively as they appear at the instant of release of the bomb; Fig. 2 is a diagrammatic view of the field of action illustrating the attacking airplane in several positions in its approach to a collision course, it being assumed in this figure that the target being the point of reference, has no motion in the system of coordinates chosen but that the airplane has all of the motion it seems to have when viewed from the target; Fig. 3 is a perspective view of a sighting device, together with certain operating and auxiliary apparatus arranged in accordance with my invention; Fig. 4 is a diagrammatic view which taken with Fig. 3 illustrates a bomb sight mechanism embodying my invention; Fig. 5 is a diagrammatic view illustrating a bomb releasing circuit comprising certain controlling switches therefor, which switches are arranged and controlled in accordance with my invention; Fig. 6 is an elevation of a portion of the bomb sight mechanism of Figs. 3 and 4 taken on the line 6—6 of Fig. 4; Fig. 7 is an elevation of a portion of the bomb sight mechanism of Figs. 3 and 4 taken on the line 7—7 of Fig. 4; Fig. 8 is a pilot indicating mechanism and control therefor arranged in accordance with my invention; Fig. 9 is a diagrammatic representation of a preferred system for transmitting angular motion used on the bomb sight mechanism of Figs. 3 and 4; Fig. 10 is a graphic representation of certain factors involved in the problem of determining certain altitude scales shown in Fig. 11 and used in the bomb sight mechanism of Figs. 3 and 4; and Fig. 12 is a graphic representation of certain factors involved in the problem of determining certain altitude scales shown in Fig. 13 and used in the bomb sight mechanism of Figs. 3 and 4.

Referring to the drawings, I have shown my invention in one form as applied to sighting mechanism intended to be used in connection with bombing apparatus for airplanes and like aircraft. Referring more particularly to Figs. 1 and 2, I have illustrated diagrammatically the general problem involved in bombing operations. It will be understood that the problem is to drop a bomb from an airplane upon a moving target, such as a battle ship, a train, etc. It is contemplated, of course, that the target may be stationary; but in the example illustrated the target is assumed to be moving. Moreover, it is assumed that the target is moving in a fixed plane, as for instance, the plane of the earth. However, it is to be understood that the target may be moving through the air in a plane parallel with the earth's plane; thus, the target may be an airplane or some other form of aircraft.

The problem is solved from the aviator's point of view. The airplane rather than any fixed point on the earth is chosen as the reference point. Therefore, the problem will be discussed in such mathematical terms as are presented to the senses of the bomber and pilot. The problem when treated in three dimensions will be discussed in terms of polar coordinates referred to a point of origin on the airplane which point preferably will be the location of the sighting telescope; but when discussing the problem in two dimensions I have chosen as the point of origin a point on the ground or water level or at the height of the target and vertically below the sighting instrument, and the axes are, the horizontal fore and aft axis OX, the horizontal athwartship axis OY, and the vertical axis OZ. Thus, in the diagram of the field of action (Fig. 1), the origin O and the horizontal axes OX and OY are shown as though they were on the ground or water level. It is to be understood, however, that the origin O and the horizontal axes may be located in an elevated plane parallel with the tangent plane to the earth's surface.

It is assumed that the coordinate axes OX, OY and OZ move and turn with the airplane. However, while the whole system of coordinates moves with the airplane through the air, the system does not tilt with the airplane. In other words, the OZ axis remains vertical and the plane containing the OX and OY axes remains horizontal.

The speed of the target is computed with relation to the airplane; and this speed is the resultant of the target's own motion and the motion of the airplane. The motion of the airplane is the resultant of its motion due to its own propulsive force and its motion due to windage. Likewise, the motion of the target is the resultant of its motion due to its own propulsive force and its motion due to windage or water currents. All of these variables are included, it will be observed, in the observations given the speed of the target with relation to the airplane. The motions of the airplane and target with relation to the earth are immaterial, except that the altitude of the airplane, of course, enters into the calculations.

Referring to Fig. 1, it will be understood that the airplane is assumed to have no motion in the system of coordinates chosen and that the only motion is that of the target and the bomb with respect to the airplane. At the instant the bomb is released, the target is at the position marked "target's position at release." The target moves along the line indicated "target's apparent motion during time of flight of bomb" while the bomb is dropping, and the bomb is dropped so as to arrive at "the point of impact" at the same instant of time as the target and thereby score a hit.

It will be observed that "the point of impact" is some distance back along the OX axis from the origin O. The reason for this is as follows: The bomb will have the same speed, of course, as the airplane at the instant of release and consequently will continue to travel forward as it drops. However, the bomb will not continue to travel forward at the same speed as the airplane because of the effect of the air motion caused by the propeller, or in other words, because of the effect of the pressure of the slip stream. As has been pointed out, the coordinates chosen are referred to a point of origin on the airplane and consequently all air motions other than that caused by the propeller, directly back along the OX axis, carry the airplane, and hence the coordinates with them. The effect of this propeller wind is known as "trail."

In other words, suppose that the airplane due to its own propulsive power is travelling forward straight ahead along the OX axis. Under these conditions it may be assumed that the airplane is standing still and the air current which is due exclusively to the propeller, is blowing from straight ahead. As has been pointed out, Fig. 1 illustrates this set of conditions. There is no motion of air athwartship with respect to the airplane or bomb because the airplane, the bomb, and the coordinates chosen are carried along with any such air movement. Therefore, the only two forces to be accounted for as acting on the bomb in dropping are the force of gravity and that of the air moving back along the OX axis; and in consequence, the bomb travels back along the OX axis as it drops toward the earth, its "trajectory" being wholly in the X—Z plane. This distance that the bomb travels back along the OX axis, i. e., "trail," is the distance along the OX axis of "the point of impact" from the vertical OZ axis.

It is to be understood that for a given set of conditions with respect to the altitude and air speed of the attacking airplane, the "trail" for a given bomb and releasing mechanism will be a fixed distance directly back along the OX axis, and consequently "the point of impact" bears a fixed relation with respect to the airplane providing the altitude and air speed remain constant. In the following discussion, therefore, the airplane and "the point of impact" will be considered to be a fixed system, "the point of impact" of course being located in the horizontal plane in which the target is moving.

It will be understood in the light of the above discussion that the bomber has two separate problems: (1) To cause the target to approach along a path such that it will pass through "the point of impact," and (2) To determine a point along this path of the target's motion such that if the bomb is released when the target is at this point, the bomb will make connections with the target at "the point of impact" and thereby score a hit.

It is to be understood that with such a system of coordinates as are chosen in Fig. 1, the elements of the problem that necessarily will be considered are: The apparent target speed; and the time of flight of the bomb. The apparent target speed is the resultant of two components: one the effect of the apparent wind at the target, and the other, the effect of the air speed of the airplane. The apparent wind at the target, in turn, is the resultant of two components; one the effect of the target's own speed, and the other the effect of true wind. By "true wind" is meant the existing wind relative to a fixed point on the earth.

The apparent wind at the target and apparent target speed are directed quantities and will, therefore, be represented as vectors. The latter of these two quantities is directly observable. The time of flight for a particular type of bomb is a known joint function of the altitude and the effect of the pressure of the slip stream, or in other words, the effect of the apparent wind at the airplane or the air speed of the airplane, assuming, of course, that the bomb is always released in the same manner. It will be understood that for the present problem the slight effects upon the time of flight of variations of air density from the mean annual value, the rate of change of altitude, of the latitude of the place, etc. may be neglected.

In general, therefore, the linear sight offset can be represented completely by the resultant of two vectors, viz; Offset for apparent target speed, and offset for "trail." The offset for apparent target speed is the product of the apparent target speed by the time of flight of the bomb and is opposite in direction to the apparent target speed.

The offset for "trail" is a known function of altitude, apparent wind at the airplane and the type of bomb.

For convenience the apparent target speed will be resolved into two components oblique to each other, one the effect of the air speed of the airplane and the other the effect of the apparent wind at the target. The sight offset also will be resolved into two components, one fore and aft and the other athwartship.

Referring to Fig. 1 and bearing in mind the elements which must be considered, it will be understood that the vector WT representing wind times the time of flight of the bomb relates to the apparent wind at the target. The apparent motions of the ground need not be considered since, as has been pointed out, the action is between the attacking airplane and the target only. Thus, the true wind and the true target speed may be combined as a single vector, i. e., apparent wind at the target.

The resultant of the wind vector WT and a vector ST representing the air speed of the airplane times the time of flight of the bomb represents the total motion of the airplane relative to the target during the time of flight or in other words, this resultant reversed represents the total motion of the target during the same time in the system of coordinates chosen. Since this vector will, in fact, represent the total target speed in the system times the time of flight, the vector will also represent the total motion of the target during the interval from release to impact, and must joint the positions occupied by the target at these two instants of time.

It will be understood that the resultant of the wind vector WT and the airspeed vector ST, i. e., the total motion of the target during the time of flight of the bomb, or in other words the linear offset for apparent target speed, may be calculated directly by measuring the angular apparent speed of the target in the system of coordinates chosen converting it to linear speed and multiplying the speed thus converted by the time of flight of the bomb. The offset for trail, as has been pointed out, may be determined readily from the known data with respect to the altitude and the airspeed of the airplane. Therefore, with the known data with respect to the altitude and airspeed of the attacking airplane and with the observable datum with respect to the target's angular apparent velocity sufficient information will be had to determine the proper sight offset, which as has been pointed out, is the resultant of the offset for trail and the offset for apparent target speed.

More specifically, therefore, the problems which are presented to the bomber are to determine from the known data with respect to the altitude and the air speed of the airplane the distance back along the OX axis of "the point of impact," it being understood that the magnitude of this distance remains constant for constant conditions with respect to the altitude and air speed of the airplane; to measure the target's angular velocity and from that to deduce its total motion during the interval of time measured by the time of flight of the bomb, and to determine the apparent direction of that motion and the direction and distance of the target from "the point of impact"; and with the known data with respect to the location of "the point of impact," and the target's direction and the apparent direction of its motion to instruct the pilot to fly the airplane in such a direction that "the point of impact" will be carried on a collision course; and further, with the calculated data with respect to the location of "the point of impact" and the target's total motion during the time of flight of the bomb to effect the release of the bomb at such a time that the bomb will arrive at "the point of impact" at the same instant as the target.

In solving the bombing problem chosen certain elementary quantities must be considered. For convenience, these are tabulated immediately below since they will occur frequently in the following discussion and description of the sight.

X is the distance the target is ahead of the airplane.

Y is the athwartship distance of the target, in the problem chosen to the right of the airplane.

$h$ is the altitude, i. e., the height of the airplane above the plane in which the target is moving. (It is taken as unit distance when reckoning trigonometric functions of angles at the origin.)

S is the airspeed of the airplane.

W is the apparent wind at the target.

T is the time of flight of the bomb. It is taken as unit time.

$\alpha$ is the angular distance the target is ahead of the airplane projected onto the vertical fore and aft plane.

$\beta$ is the athwartship angular distance of the target (in the problem chosen), to the right of the airplane.

Range forward is the distance the target is ahead of the airplane at the time of release of the bomb.

Range athwartship is the distance the target is to the right (in the problem chosen) of the airplane at the time of release.

Trail is the distance the impact occurs behind the airplane.

$\alpha_r$ is the range angle or sight offset forward, i. e., the angle subtended at the origin by the range forward, or the value $\alpha$ must have at the instant of release.

$\beta_r$ is the range angle or sight offset athwartship, i. e., the angle subtended at the origin by the range athwartship, or the angle $\beta$ must have at the instant of release.

$\theta$ is the angular distance the target is ahead of the airplane, measured in the oblique plane that contains the target and the fore and aft line of the airplane.

$\omega$ is the angle made by the vector W and the fore and aft axis OX. That is, the relative direction of the apparent wind at the target.

$\phi$ is the angle between a straight line joining the target and "the point of impact," and the fore and aft axis OX. It is the relative bearing of the target from "the point of impact."

$\phi'$ is the angle between the apparent direction of the course or of the path of motion of the target and the fore and aft axis OX.

The quantities $\alpha$, $\beta$, and $\theta$ are shown in Fig. 1 at the values they assume at the instant of release. It is to be understood, however, that they are the general values of the variables as defined.

As has been pointed out, the known data are the altitude and the air speed of the airplane, while the observable data are the angular position and apparent angular velocity of the target.

The angular position and velocity of the target are determined by means of a telescope 10 (Fig. 3) mounted in the attacking airplane. The angular position and velocity are determined simply by moving the line of sight of the telescope about predetermined axes, as for example, the fore and aft and athwartship axes so as to maintain it on the target, the angular position and velocity of the target, of course, with relation to the airplane, being thereby measured about these axes.

The telescope is mounted rigidly in a suitable frame (not shown) and the line of sight is kept bearing on the target by means of a mirror or prism 11 located in front of the objective 12. It will be observed that the telescope looks into the mirror along a line parallel to the axis fore and aft. As will be described in detail the mirror is mounted in a gimbal type mounting that allows it to move freely in all directions through a comparatively large solid angle. One axis of this gimbal system is parallel to the fore and aft axis OX of the airplane and the other swings in a vertical plane, parallel to its athwartship axis OY, i. e., swings in the YZ plane.

It is desirable that the fore and aft and athwartship components of the target's apparent angular velocity be measured by some means that will yield the knowledge of its present angular rate at the present instant of time, i. e., the instantaneous values of its apparent angular velocity. In order to bring about this result I have taken advantage of the inherent characteristic of a gyroscope whereby if its spin speed be kept constant its angular rate of precession will be proportional to the instantaneously measurable torque couple which is applied to cause the precession.

The mirror or prism 11 is connected mechanically to a suitable gyroscope 13 so as to cause the line of sight to move with the gyroscope about axes parallel and adjacent to its gimbal axes which are the fore and aft axis OX and another at right angles thereto, the latter lying generally athwartship, and the line of sight is moved to maintain it on the target by applying torques to the gyroscope to cause the necessary precession to adjust the mirror or prism. Since the target is moving with relation to the airplane the mirror or prism must be given a corresponding motion.

As has been pointed out, the mirror 11 is the element of the telescope which is connected with the gyroscope. The gyroscope movement is applied directly to the mirror about the fore and aft axis OX, but about the axis at right angles to OX the mirror is given but one half the angle of movement of the gyroscope since the angular movement of the line of sight about this axis is equal to twice the angular movement of the mirror. This is accomplished by mounting the mirror in a gimbal type mounting that allows it to move freely in all directions throughout a comparatively large solid angle, and a suitable linkage mechanism.

As shown, the mirror is mounted for rotation about its variable axis by means of a pair of projecting stud-like shafts 14 which are mounted for rotary movement in bearings provided for them in a suitable forked supporting member 15. This forked member is rigidly secured to the fore and aft gimbal axis 16 of the gyroscope and consequently imparts the gyroscope's angular movement about the fore and aft axis to the mirror. The gyroscope's angular movement about the variable axis at right angles to OX is transmitted to rotate the mirror about its variable axes 14 by means of a link connection which imparts one half of this component of the mirror but one half of this component of the gyroscope's angular movement. This connection comprises an angle dividing mechanism including a link 20 secured at its upper end to one end of a shaft 21 which is mounted for rotation in a bearing support 22 rigidly secured to the gyroscope's fore and aft gimbal axis 16. The opposite end of this shaft 21 is mechanically connected to one of the mirror supporting shafts 14 by means of a pair of cranks 23 and 24 of equal length, each secured at one end to one of the respective shafts 21 and 14, and a link 25 interposed between and mechanically interconnecting the free ends of these cranks. It will be observed by reason of this connection that the mirror will always follow the angular movement of the link 20, i. e., the mirror will always be rotated through an angle equal to the angular movement of the link 20. The gyroscope's movement about its variable axis at right angles to OX is transmitted to the link 20 by means of a link 26 pivotally connected at its upper end to the forked support 15, and mechanically connected at its lower end to the lower portion of the vertical gimbal ring 13a of the gyroscope by means of a link 26a. The link 26 has the same length as the radius from the center of the gyroscope gimbal system to the point of attachment of link 26a, and is mechanically interconnected to the lower end of the link 20 by means of a pin and slot connection 27. The pin for this connection is located at a distance from the pivotal axis of link 26 on forked member 15 equal to the distance of that pivotal axis from the center of shaft 21. It will be apparent that by reason of this arrangement the link 20 and consequently the mirror 11 will be moved through but one half of the angular movement of the gyroscope about its variable axis at right angles to OX.

It will be observed that the linkage connections between the gyroscope 13 and the mirror 11 gives the mirror such relation to the gyroscope that the line of sight of the telescope 10 is always maintained parallel to the spin axis of the gyroscope. It will also be observed that in order to keep the line of sight on the target it is only necessary to keep the spin axis of the gyroscope pointing at the target, and in order to know the angular rate of the apparent motion of the target it is only necessary to know the rate at which the spin axis is changing its direction. It will be understood that the gyroscope is in neutral suspension so that it is free to move relative to its frame. Its spin axis, therefore, will retain whatever direction it has irrespective of the rolling, pitching, yawing or turning of the airplane.

The gyroscope spin axis when once pointed at the target will continue to point to the target by reason of its inherent characteristic except for the apparent motion of the target. Thus, in order to keep the spin axis pointed at the target in spite of the target's motion it is necessary to precess the gyroscope in the direction of the target's apparent motion and at the angular rate of that motion. This necessary precession is brought about by applying to the gyroscope a measured resultant torque in a plane through the spin axis and containing the line of the desired motion.

Preferably, this torque will be measured and applied in two component parts, one of which induces rotation of the gyroscope in the vertical plane fore and aft (plan XOZ Fig. 1), and the other in the vertical plane athwartship (plane YOZ Fig. 1) assuming the airplane to be for the moment on even keel.

In the most common type of bombing operation, after the bombing airplane is on the right course for a hit, the target has or is assumed to have, uniform linear apparent motion when viewed from the bombing plane. As has been pointed out, in order that the line of sight may stay on the target, it is necessary that the spin axis of the gyroscope should execute such angular motions that it points continuously in the direction of the target. It is desirable that suitable means be provided for automatically controlling the motion of the gyroscope so that once its motion has been adjusted to point continuously to the target, the adjustment need not be changed subsequently as the battle action progresses.

The angular rate of precession of a gyroscope is:

$$KT_0 \cdot \text{secant } \theta_0$$

in which $K$ is a machine constant related to the dimensions of the gyroscope and its spin speed, $T_0$ is the torque applied to some axis of the gimbal system to cause precession of the gyroscope, and $\theta_0$ is the complement of the angle made by the axis of the torque $T_0$ with the spin axis of gyroscope, and is measured in the plane, generally oblique, that contains both the axis of torque $T_0$ and the spin axis.

If the apparent motion of the target is uniform along a line parallel to the axis of the torque $T_0$, the angular precession rate required is:

$$\frac{V_0}{h} \cdot \cos^2 \theta_0$$

in which $V_0$ is the linear apparent velocity of the target, and $h$ is the perpendicular let fall on the target's apparent path from the bombing plane.

It is to be noted that in the preceding discussion, $V_0$ is the total or resultant linear velocity, and $T_0$ is the total or resultant torque.

As soon as the airplane has arrived at the right course for a hit, it may be assumed without material error, for the purpose of establishing the relation of precession torque to linear apparent velocity, that the apparent path of the target to "the point of impact" lies directly below the bombing plane, rather than to one side or the other in accordance with the effect of "trail" as shown in Fig. 1. With this assumption in mind, it will be observed that $h$ is merely the altitude of the bombing plane.

It will be apparent therefore, that we have the following equation:

$$\frac{V_0}{h} \cdot \cos^2 \theta_0 = KT_0 \sec \theta_0$$

Solving for $T_0$, we have:

$$T_0 = \frac{1}{K} \cdot \frac{V_0}{h} \cdot \cos^3 \theta_0$$

If $T_0$ and $V_0$ now be regarded as resultant directed quantities with horizontal components $T_x$ and $T_y$, and $V_x$ and $V_y$, respectively, chosen in order parallel and perpendicular to the fore and aft axis OX of the bombing plane, each component of torque will be related to the corresponding component of velocity as follows:

$$T_x = \frac{1}{K} \cdot \frac{1}{h} \cdot \cos^3 \theta \cdot \cos^3 \beta \cdot V_x$$

and $$T_y = \frac{1}{K} \cdot \frac{1}{h} \cdot \cos^3 \theta \cdot \cos^3 \beta \cdot V_y$$

in which $\theta$ is the complement of the angle made by the axis of torque $T_x$ with the spin axis, and, as has been pointed out, $\beta$ is the angle, measured in a vertical plane athwartship, by which the target is off the vertical plane through the fore and aft line of the bombing airplane. It is to be noted that the angle $\theta$ equals the angular distance the target is ahead of the airplane, measured in the oblique plane that contains the target and the fore and aft line of the airplane, and the angle $\beta$ is the angular distance the target is to the right (in the problem chosen, Fig. 1) of the airplane.

It is desirable, as has been pointed out above, that once the sight has been adjusted to point continuously to the target it be unnecessary to change the adjustments subsequently as the battle action progresses. It is preferable, therefore, that the quantities to be adjusted be chosen from among those whose values remain constant throughout the battle action.

In the above equations, the factor $$\frac{1}{K}$$

is always the same for a given gyroscope; the factor $$\frac{1}{h}$$

is to be set from time to time, by the bomber, to agree with the altitude $h$ at which the bombing plane flies during the attack; and the components $V_x$ and $V_y$ of the target's apparent velocity $V_0$ remain constant. The factors $\cos^3 \theta$ and $\cos^3 \beta$ change continuously as the battle action progresses.

I have chosen, therefore, as the quantities to be measured, the constant velocity components $V_x$ and $V_y$, and I adjust the gyroscope and consequently the line of sight in accordance with the measured values of these velocity components. More specifically, I apply torques to the gimbal system of the gyroscope 13 in accordance with the above torque ($T_x$, $T_y$) equations.

It will be observed, with the above torque equations in mind, that if constant settings be made of some suitable force measuring devices, as for example, suitable measuring springs, and if these settings represent and measure forces proportional to the constant velocity components $V_x$ and $V_y$ of the velocity $V_0$, and further if these forces be applied to the gyroscope gimbal system at leverages always equal to:

$$p \cdot \frac{1}{K} \cdot \frac{1}{h} \cdot \cos^3 \theta \cdot \cos^3 \beta$$

in which $p$ is a factor, related to the altitude $h$ and to the air speed $S$, that influences the ratio in which the measured forces are to be proportional to the velocity components $V_x$ and $V_y$, then component torques equal to $T_x$ and $T_y$ will be applied to the gimbal system. In other words, the gyroscope will be caused to precess at a varying angular rate so that its spin axis and consequently the line of sight will always point at the target.

The significance and utility of the factor $p$ are not easy to explain completely at this place and their complete explanation is therefore deferred until the description shall have progressed so far as to make them more easily intelligible, but I do state here that it is desirable to have the ratio in which the settings of the force measuring devices are proportional to the velocity components $V_x$ and $V_y$ change when $h$ changes or when the air speed of the airplane changes and furthermore to change in a manner peculiar to the type of bomb and mode of release employed. The factor $p$ is introduced into the overall leverage to effect such a change.

It will be remembered that in any particular battle action the altitude $h$ of the airplane and its air speed $S$ are assumed to remain constant and therefore the factor $p$ does not vary during any one battle action. It may, therefore, be regarded as a constant factor and treated as a machine constant, after the altitude and air speed have been set at the beginning of the battle action. The factor $p$ is defined as the ratio of the altitude of the plane to the time of flight of the bomb. That is to say, $$p = \frac{h}{T}$$

in which $T$ is the time from the instant of release of the bomb until it reaches the level of the target.

In order to apply these forces, which will be measures in terms related to $p$, of the velocity components $V_x$ and $V_y$, I provide suitable force measuring spring 30 and 31 (Fig. 4), together with suitable mechanisms for adjusting their leverages to apply forces which are measures of the velocity components $V_x$ and $V_y$, respectively, and apply these forces to the gyroscope gimbal axes OX and OY at leverages always equal to:

$$p \cdot \frac{1}{K} \cdot \frac{1}{h} \cdot \cos^3 \theta \cdot \cos^3 \beta$$

The factors $\cos^3 \theta$ and $\cos^3 \beta$ will be generated and introduced automatically to agree with the values which the angles $\theta$ and $\beta$ attain as the battle action proceeds.

The component torques $T_x$ and $T_y$ are applied to the gimbal axes of the gyroscope 13 to cause the precession of the gyroscope about the fore and aft and athwartship axes through the medium of motors 32 and 33 (Fig. 3). The motor 32 applies the torque for precessing the gyroscope fore and aft, while the motor 33 applies the torque for precessing it athwartship. These motors are direct current series motors without commutators and apply torques in accordance with the currents supplied to them. The motors 32 and 33 are always maintained in their positions of maximum torque. In other words, the fields of these motors are caused to follow their armatures so that the positions of the fields relative to their armatures are always those of maximum torque. This movement of the fields with the armatures is effected by means of suitable follow-up motors 34 and 35 which are suitably controlled so as to be energized to rotate the field members in the proper direction and at a speed sufficient to maintain the positions of maximum torque between the fields and their respective armatures. The follow-up motors 34 and 35 are provided with suitable direct current electrical supply sources 36 and 37 respectively. It will be understood, of course, that a common supply source may be provided for these motors. Each motor is provided with two oppositely wound series field windings 40, 40a and 41, 41a. Each set of these windings is controlled by means of corresponding contact devices 42 and 43 whereby the starting, stopping and direction of rotation of the follow-up servo-motors are controlled in accordance with the movements of the armatures of the respective torque motors 32 and 33. The contact devices 42 and 43 are provided with contact arms 42a and 43b mechanically connected with the field members of their associated torque motors 32 and 33 and arranged to cooperate with spaced contacts 42b and 43a mechanically connected to rotate with the armature of these motors so that when the armature of either torque motor is rotated the associated follow-up motor will be energized to impart rotation to the motor field in the same direction and at a speed sufficient to maintain the position of maximum torque between the armature and field.

The torque motors 32 and 33 are connected in series with similar motors 44 and 45 respectively (Fig. 4), the latter motors serving to measure the currents supplied to the motors 32 and 33. The torques of the motors 44 and 45 are balanced against the forces generated by the measuring springs 30 and 31, and consequently, these motors serve to measure the components of the torque applied to the gyroscope.

As shown, the motor 44 is mechanically connected with its associated measuring spring 30 by means of a compound lever mechanism 46, a similar lever mechanism 47 serving to connect the motor 45 with its associated measuring spring 31. It is sufficient to state at this point that the overall ratios of these compound lever mechanisms are varied by some suitable means, as the battle action proceeds, so that if the torques of the motors 44 and 45 just balance the measuring springs 30 and 31 respectively, the precession rates of the gyroscope 13 are just right to keep the line of sight on the target. In other words, the overall ratios of these lever mechanisms are always maintained equal to:

$$p \cdot \frac{1}{K} \cdot \frac{1}{h} \cdot \cos^3 \theta \cdot \cos^3 \beta$$

The balances between the torques of the motors 44 and 45 and their respective measuring springs 30 and 31 are maintained automatically as the battle action proceeds by suitable servo-motors 50 and 51, which serve to control suitable resistances included in the corresponding circuits comprising the fields and armatures of the torque application and torque measuring motors 32, 44 and 33, 45. As shown, the servo-motor 50 controls a suitable potentiometer 52 included in the field and armature circuits for the motors 32 and 44, while the servo-motor 51 controls a similar potentiometer 53 included in the field and armature circuits provided for the motors 33 and 45. Each of the motors 50, 51 is provided with two oppositely wound series field windings, the motor 50 having series field windings 54, 54a of this character and the motor 51 having similar field windings 55, 55a.

During normal operation the servo-motors 50 and 51 are controlled by their respective torque measuring motors 44 and 45 by means of suitable contact devices 56 and 57 respectively, whereby the starting, stopping and direction of rotation of the servo-motors are controlled in accordance with the movements of the torque measuring motors. It will be understood that in operation the central movable elements of the contact devices 56 and 57 will be moved in accordance with the movements of the rotors of their associated torque measuring motors; when either of these elements has been moved a distance in one direction or the other sufficient to absorb the clearance between it and one or the other of the fixed contacts disposed on opposite sides of it an energizing circuit for one or the other of the oppositely wound series field windings of the associated servo-motor will be energized, which, of course, will effect a rotation of the servo-motor in a corresponding direction.

The torque application and torque measuring motors are provided with a suitable direct current source of electrical supply 58; and the servo-motors 50 and 51 are provided with suitable direct current electrical supply sources 60 and 61 respectively. While separate electrical supply sources have been indicated for the torque motors and for the two servo-motors, it will be understood, of course, that these motors may be supplied from a common source.

The control for the torque application motor 32 further comprises a suitable joker switch 62; a similar control switch 63 is provided for the torque application motor 33. These joker switches are provided so that the maximum electro-motive force of the supply source 58 may be applied to the torque application motors 32 and 33 whereby the gyroscope precession rates can be increased temporarily at will to their maximum values.

As shown, the joker switches comprise a plurality of poles secured to and operated by common control handles 62A and 63A respectively. Thus, the joker switch 62 is provided with five poles 62a, 62b, 62c, 62d and 62e. The poles 62a, 62b and 62c have, as shown, two normally closed contacts; the pole 62d has two normally open contacts; and the pole 62e has four normally open contacts. It will be observed by reference to Fig. 4 that when the control handle 62A is moved in either direction from its neutral position one contact of each of the poles 62a, 62b, and 62c will be opened, while one or the other of the contacts of the pole 62d will be closed, and also that one or both of either the right or left hand contacts of the pole 62e will be closed depending upon the extent of the movement imparted to the control handle 62a. The joker switch 63 is provided with a similar arrangement of poles 63a, 63b, 63c, 63d and 63e.

As has been pointed out, the servo-motors 50 and 51 operate to control the currents supplied to the torque measuring motors 44 and 45, and consequently to the torque application motors 32 and 33, so that a balance is always maintained between the torque measuring motors and the measuring springs 30 and 31 respectively; or in other words, so that the forces generated by the springs 30 and 31 are applied to the gyroscope 13 about its fore and aft and athwartship axes respectively through the lever mechanisms 46 and 47, the overall ratios of which are always maintained equal to:

$$p \cdot \frac{1}{K} \cdot \frac{1}{h} \cdot \cos^3 \theta \cdot \cos^3 \beta$$

The operation of both torque motor systems is identical, and consequently only that comprising the torque motors 32 and 44 will be described in detail. Assuming that the various elements of this system occupy their respective positions shown in Figs. 3 and 4, it will be understood that the series torque motors 32 and 44 will be electrically connected in series with the electrical supply source 58 and the potentiometer 52. This electrical circuit may be traced from the positive side of the supply source 58, through the conductor 64, the field 32a of the torque application motor 32, the conductor 65, the field 44a of the torque measuring motor 44, the resistance portion 66 of the potentiometer 52, the contact 67 provided for this potentiometer, the conductor 68, the armature 44b of the torque measuring motor 44, the conductor 70, the normally closed pole 62b of the joker switch 62, the conductor 71, the armature 32b of the torque application motor 32, the conductor 72, the normally closed pole 62c of the joker switch 62, the conductor 73, the potentiometer contact 74 and thence through the potentiometer resistance portion 75 and the conductor 76 to the negative side of the supply source 58.

As pointed out above, the two torque motor systems are identical and the electrical connections between the elements of the two systems are the same. Thus, the torque application motor 33 (Fig. 3) is electrically connected with the supply source 58 and with the torque measuring motor 45 through the switch 63 by means of conductors 64a and 65a and 71a and 72a corresponding respectively to the conductors 64 and 65 and 71 and 72 of the system just described.

It will be understood that when the potentiometer contacts 67 and 74 occupy their neutral positions shown in Fig. 4 no current will flow through the torque motor armatures; however, in the event the servo-motor 50 be energized by the closing of the contact device 56 in either direction in response to an unbalance in the torques exerted between the spring 30 and its torque measuring motor 44, the resistance ratios of the potentiometer will be varied by the operation of the servo-motor 50 so as to cause a current to flow through the torque motor armatures having such a value that the motor 44 will develop sufficient torque to just balance the force generated by the spring 30 multiplied through the lever mechanism 46. When this condition has been attained the contact device 56 will be moved to its neutral position, at which position it is shown in Fig. 4, so as to deenergize the servo-motor 50. It will be readily appreciated in view of the foregoing discussion that the torque application motor 32 will apply the same torque to its fore and aft gimbal axis as is exerted by the torque measuring motor 44 on the spring 30 through the lever mechanism 46. It is to be understood that the servo-motor 50 will operate to control the potentiometer 52 so as to always cause a current of the proper value to flow in the armature circuit of the torque motor 44 whereby the torque exerted by this motor will balance the force generated by the spring 30 multiplied through the lever mechanism 46 with the result that the torque application motor 32 will always apply to its fore and aft gimbal axis a torque equal to the force generated by the spring 30 and multiplied by the lever mechanism 46.

If it be desired to cause the torque application motor 32 to apply maximum torque to the fore and aft gimbal axis of the gyroscope 13, i. e., if it be desired to cause the gyroscope to precess at its maximum rate, it is merely necessary to throw the joker switch control arm 62A in one direction or the other depending upon the direction at which it is desired to precess the gyroscope. For the purpose of illustration, assume that the joker switch control arm 62A is moved so that the pole arms 62a, 62b, 62c are moved to the right as viewed in Fig. 4. It will be observed that this operation causes the left hand contacts of the poles 62a, 62b, and 62c to open, the right hand contacts of the pole 62d to close and the two right hand contacts of the pole 62e to close. It will be observed that this operation effects an interruption of the power circuit for the servo-motor 50 at the pole 62a, and likewise effects an interruption of the power circuit for the torque measuring motor 44 at the pole 62b. A power circuit for the torque application motor 32, however, is completed through a suitable controlling resistance 77. This power circuit may be traced from the positive side of the direct current supply source 58, through the conductor 64, the field 32a of the motor 32, the conductor 65, the conductor 70, the closed right-hand contacts of the pole 62d, the conductor 72, the armature 32b of the torque application motor 32, the conductor 71, the portion 80 of the resistance 77, the conductor 81, the closed extreme right-hand contacts of the pole 62e and thence through the conductor 82 to the negative side of the supply source 58. It will be observed, therefore, that the motors 44 and 50 will have been excluded by the above described operation of the joker switch, while the torque application motor 32 will have been connected in series with the resistance portion 80 directly to the direct current supply source 58. Moreover, it will be observed that as a result of this operation, the motor 32 will operate to apply maximum torque to the fore and aft gyroscope gimbal axis in a direction corresponding to the direction of operation of the joker switch 62. It will be understood that the resistance portion 80 will be proportioned to give the maximum torque current to the application motor 32. The entire resistance 77 can be included in the motor circuit by operating the joker switch control arm 62A so as to close only the middle right-hand contact of the pole 62e rather than both right-hand contacts of this pole. This provides for the application of a substantially constant torque of reduced value to the fore and aft gimbal axis of the gyroscope 13.

The operations of the joker switch control arm 62A in the opposite direction, that is, in a direction to move the pole arms to the left, as viewed in Fig. 4, provides for similar controlling effects on the operation of the torque application motor 32 but in the opposite direction.

The operation of the joker switch 63 and its resulting control of the torque motors 33 and 45 is exactly the same as described in connection with the control of the torque motors 32 and 44 effected by the operation of their control switch 62. Thus, with the switch arm 63A in its neutral position, as shown in Fig. 4, the servo-motor 51 will be permitted to operate to maintain a balance between the torque measuring motor 45 and the measuring spring 31, whereby the torque applied to the athwartship gimbal axis of the gyroscope by the torque application motor 33 will be measured and controlled. The joker switch control arm 63A may be moved to its limiting position in either direction so as to effect a deenergization of the servo-motor 51 and the torque measuring motor 45, while establishing power connections for the torque application motor 33 through a portion of the resistance 83 thereby providing for the application of maximum torque to the athwartship gimbal axis in a direction corresponding to the direction of movement of the contact switch arm; or the switch arm 63A may be moved from its neutral to its intermediate position in either direction so as to effect the application of a reduced torque of substantially constant value to the athwartship gimbal axis.

It will be observed in view of the foregoing discussion that the joker switches 62 and 63 provide a means for applying a substantially constant torque havnig either maximum or a reduced value to the respective gimbal axes of the gyroscope 13 without affecting the settings of the springs 30 and 31.

It will be remembered that the settings of the springs 30 and 31 will be adjusted so as to generate forces which will be measures in terms related to $p$, of the target's apparent fore and aft and athwartship velocity components $V_x$ and $V_y$ respectively. It will also be remembered that these forces are to be applied to the gyroscope gimbal axes OX and OY at leverages always equal to:

$$p \cdot \frac{1}{K} \cdot \frac{1}{h} \cdot \cos^3 \theta \cdot \cos^3 \beta$$

the factors $\cos^3 \theta$ and $\cos^3 \beta$ being introduced automatically and continuously to agree with the values which the angles $\theta$ and $\beta$ attain as the battle action proceeds.

The factor $$\frac{1}{K}$$

is always the same for a given gyroscope. The factors $p$, $$\frac{1}{h}$$

$\cos^3 \theta$ and $\cos^3 \beta$, as has been pointed out, are introduced by the compound lever mechanisms 46 and 47. The factor $$\frac{p}{h}$$

or, which is the same thing $$\frac{1}{T}$$

is introduced to these mechanisms by the levers 90 and 91 respectively, the factor $\cos^3 \beta$ is introduced by the levers 92 and 93 respectively; and the factor $\cos^3 \theta$ by the levers 94 and 95.

It will be observed that the levers 90 and 91 are provided with adjustable fulcrums 96 and 97; and that the levers 92 and 93, and 94 and 95 are provided with adjustable fulcrums 98 and 99, and 100 and 101 respectively. These fulcrums are double acting; in other words, the fulcrums are arranged so that they can exert either a pushing or a pulling action on their associated levers. For this purpose the levers as shown are provided with suitable channels arranged longitudinally thereof and in which are received suitable studs or pins provided on the associated fulcrums. This double acting arrangement is necessary because during the battle action the fulcrums at times may apply forces on their associated levers in one direction, while at other times they may apply forces in the opposite direction.

It will also be observed that the levers 90 and 91 are mechanically connected at their upper ends, as viewed in Fig. 4, through suitable anti-friction joints 102 and 103 with the armatures 44b and 45b of the torque measuring motors 44 and 45 respectively, and at their lower ends are connected by means of similar joints 104 and 105 with the upper ends of the levers 92 and 93 respectively. The lower ends of the levers 92 and 93 are similarly connected with the upper ends of the levers 94 and 95 by means of joints 106 and 107, the lower ends of the latter levers being operably associated with the measuring springs 30 and 31 through the medium of suitable levers 108 and 109, to which they are connected by means of suitable anti-friction joints 110 and 111.

As shown, the measuring springs 30 and 31 are mounted upon suitable vertically adjustable supports 112 and 113, and are connected to apply their forces to their respective lever mechanisms 46 and 47 by means of levers 114 and 115 each of which is pivotally mounted on its associated support. It will be observed that each of these levers has a right angle form, one leg being positioned vertically and the other horizontally, as viewed in Fig. 4. The vertical legs as shown are pivotally connected intermediate their ends to up-right rigid supporting portions 112a and 113a formed on the supports 112 and 113, while the horizontal legs are provided with anti-friction bearings on their associated levers 108 and 109. The springs 30 and 31, which preferably although not necessarily will be of the compression type, are interposed between the vertical portions of their levers 114 and 115, and the parallel upright rigid portions of the members 112a, 113a formed on their respective supports 112 and 113, as is clearly shown in Fig. 4. It will be readily understood that by reason of the above described lever and spring arrangements the forces applied by the springs on their associated levers 114 and 115 will be transmitted by the lever mechanisms 46 and 47 to their respective torque measuring motors 44 and 45.

The leverages of the springs 30 and 31 on their associated lever mechanisms 46 and 47 are controlled by means of suitable adjusting screws 116 and 117 respectively which as shown are in threaded engagement with the adjustable supports 112 and 113 provided for the springs. It will be obvious that the effective forces exerted by the springs 30 and 31 on their lever mechanisms 46 and 47 can be controlled readily by means of these screws. In other words, the settings of the adjusting screws 116 and 117 represent and measure in terms related to $p$, the constant apparent velocity components $V_x$ and $V_y$ in the above torque equations.

The adjustable fulcrums 96 and 97 of the levers 90 and 91 are controlled by means of a suitable adjusting screw 118 which is mechanically connected with both of the fulcrums so as to effect a simultaneous adjustment of these members. As shown, the adjusting screw 118 is in threaded engagement with the fulcrum 96 so as to impart motion directly thereto, and is connected to the fulcrum 97 by means of a shaft 120, to one end of which the screw is connected by means of suitable bevel gears 121, and by means of a screw 122 connected to the other end of the shaft 120 by bevel gears 123, and to the fulcrum 97 by a suitable threaded connection. This arrangement insures a simultaneous adjustment of the fulcrums 96 and 97 in the same direction and to the same degree. Therefore, the setting of the screw 118 represents and measures the factor $$\frac{p}{h}$$

of the above torque equations or its equivalents, viz.

$$\frac{1}{T}$$

The control of the $\cos^3 \beta$ and $\cos^3 \theta$ levers 92 and 93, and 94 and 95 respectively is effected by moving their adjustable fulcrums. As has been pointed out, the over-all ratios of the compound levers 46 and 47 will be varied automatically as the battle action proceeds so that if the torque of motors 44 and 45, and consequently, the torques of the precession motors 32 and 33, just balance the forces applied by the measuring springs 30 and 31, the precession rates of the gyroscope 13 will be just right to keep the line of sight on the target.

The automatic apparatus for controlling the $\cos^3 \beta$ and $\cos^3 \theta$ levers is arranged so that the line of sight is kept moving over the ground or water to follow the target in a straight line in whatever direction and at whatever constant speed the bomber has set on the adjusting screws 116 and 117. The manual adjustment by the bomber consists in setting the screws 116 and 117 until the components of the motion of the line of sight over the ground or water are just right to keep the sight on the target; the bomber uses the screw 116 to vary the speed fore and aft, and the screw 117 to vary the speed athwartship.

It is desirable in order to make the proper adjustments of the movable fulcrums provided for the $\cos^3 \theta$ and $\cos^3 \beta$ levers to measure the angles $\alpha$ and $\beta$, to convert these measurements into suitable angular functions, and apply them to the fulcrums in the terms of these functions.

This necessitates a vertical seeker or a vertical keeper, i. e., some standard of judgment of the vertical. For this purpose, I have provided a neutrally suspended gyroscope 124 (Fig. 3); it is to be understood, however, that any suitable vertical seeker or keeper may be used.

As is well understood by those skilled in the art, a neutrally suspended gyroscope does not maintain a vertical even though adjusted to the vertical initially, but tends to maintain a constant direction in universal space. As is also well understood, the nadir is moving at the rate of 15° per hour $\times$ cos of latitude. In order to cause the neutrally suspended gyroscope 124 to maintain a vertical, I apply to the gyroscope a corrective precessing torque in accordance with the change in true direction of the nadir (caused by the earth's rotation) so as to maintain the spin axis of the gyroscope vertical. This corrective precessing torque is applied to the gyroscope by means of a pair of latitude weights arranged to cause the gyroscope to precess from west to east at the rate of 15° per hour·cos of latitude. I have provided a pair of latitude weights 125 for this purpose. It will be understood that these weights will be located on and adjustable along the equator of the gyroscope; as shown, the weights 125 are mounted on suitable ring members 126 arranged to rotate on vertical extensions (not shown) of the gyroscope casing 127.

It will be understood that the latitude weights 125 are arranged on their ring supporting members 126 so as to be located on the equator of the gyroscope and that they may be adjusted along this equator merely by moving the ring members relatively to each other.

It will also be understood that the latitude weights are so proportioned to the properties of the gyroscope that if they are set close together on the north side of the gyroscope and are kept pointing to the north they will cause the gyroscope to precess from west to east at the rate of 15° per hour assuming the gyroscope to be placed, with its spin axis vertical, at the earth's equator. If the weights are separated by moving them along the equator of the gyroscope, but the mid point between them be kept toward the north, they will partially balance each other and will exert less torque on the gyroscope but will still cause it to precess from west to east at a lower rate. Therefore, if the latitude weights 125 be adjusted a suitable distance apart, this distance being in accordance with the latitude of the locality in which the gyroscope is located, and if the mid point between the weights be kept toward the north the gyroscope will precess so that its spin axis will describe the same cone about the earth's axis that the true vertical describes, and at the same rate.

Preferably, a suitable member 128 provided with a latitude scale 129 will be provided so as to assist the bomber in the adjustment of the weights to latitude. This scale may be provided with a zero position, which position is designated in Fig. 3 by the letter "N," and may be graduated in degrees latitude in each direction from the zero point. These graduations in degrees latitude in each direction from the position "N," in effect, form two separate scales, one for each latitude weight so that in adjusting the weights to latitude it is merely necessary to set each weight opposite the corresponding latitude indication on its associated scale.

The latitude scale member 128 which as shown preferably will be of disc form is carried by a suitable sleeve member (not shown) arranged for rotary motion on a suitable vertically disposed bearing member carried by the gyroscope casing 127 (which bearing member is not shown but which may be one of the afore-mentioned vertical extensions, preferably the upper one, provided on the gyroscope casing to support the weight rings 126), so that the zero position "N" of the scale may be directed at will toward the north.

Preferably the latitude weight rings 126 will be provided with suitable means for locking them to the disc 128 so that the disc together with the ring members located in their adjusted positions with respect to the latitude scale 129 can be moved as a unitary structure. For this purpose, each ring is provided with a suitable resilient latching member 130 arranged as shown to engage suitable serrations provided in the edge of the disc 128.

In order to assist the bomber in directing the mid point between the weights 125 toward the north, the disc member 128 is provided with a second scale 132 arranged to cooperate with an index 133 fixed in any suitable manner to the gyroscope casing. This scale may be graduated in degrees from zero to 360, or may be graduated in any suitable manner so that the bomber with the knowledge of the airplane's position relative to the target at the outset, i. e., the bearing of the target from the point of departure, can correctly adjust the weights so that the mid point between them is directed toward the north.

I prefer to provide suitable means for locking the latitude scale together with the latitude weights secured thereto in their proper adjusted positions, once the scale has properly been set so that the mid point between the weights is directed toward the north, to the gyroscope casing. For this purpose I provide a suitable resilient latching member 134 mounted on the gyroscope casing and arranged to engage suitable serrations provided on the edge of a disc locking member 134a formed integrally with or otherwise suitably mechanically connected to rotate with the latitude scale member 128. This disc member 134a may be secured to the above-mentioned bearing member (not shown) provided for the disc 128.

It is also to be understood that the gyroscope will be adjusted to the vertical by some suitable means, such as suitably arranged crossed spirit levels (not shown), as shortly as possible before the approach of the bombing airplane is begun. This adjustment may be made on the ground before taking off or in the air during a time when the pilot is flying, as nearly as he can, a straight horizontal course.

If desired, the latitude weights may be rendered ineffective by setting them to 90° latitude.

While any suitable means may be used to measure the angles α and β and to transmit the measured values of these angles to some point in the mechanism where they may be utilized, I prefer to use a motion transmission system comprising transmitting and receiving instruments of the self-synchronous type. In accordance with a system of this type the angles α and β will be measured by suitable self-synchronous generators 135 and 136 (Fig. 3), and these measurements will be transmitted to corresponding self-synchronous receiving instruments 137 and 138 (Fig. 4). It will be understood that the transmitting and receiving instruments of each set are similar in construction; the construction of only one set, viz., the set comprising the instruments 135 and 137, therefore, is shown in detail (Fig. 9). The transmitting and receiving instruments 135 and 137 are somewhat similar in construction, each being provided with a poly-circuit armature winding and with a field winding, one of these windings being mounted on a rotor member. As shown, the armature winding 135a in the transmitting instrument is mounted on the rotor member while the field winding 137b in the receiving instrument is mounted on the rotor member. The armature windings 135a and 137a provided for the transmitting and receiving instruments are physically similar to three-phase distributed armature windings. As shown, like points of the armature windings 135a and 137a are interconnected electrically, while their field windings 135b and 137b are connected with a suitable alternating current source of electrical supply 139.

As shown (Fig. 3), the armatures of the generators 135 and 136 are connected mechanically with the athwartship and the fore and aft gimbal axes of the gyroscope 124 respectively, while their field members are connected mechanically with the corresponding gimbal axes of the gyroscope 13. The armature 135a of the generator 135 is connected with the athwartship axis of the gyroscope 124 by means of a suitable crank and link arrangement 135c, while the rotor 136a of the generator 136 is connected directly with the fore and aft axis of the gyroscope 124. Consequently, the armatures of these generators will be maintained in fixed angular positions in space, while their field members will be driven by the gyroscope 13 through its precession angles α and β.

In order that the angles α and β can be transmitted and determined with great accuracy, I introduce a speed ratio between the transmitting instruments 135 and 136 and their respective receiving instruments 137 and 138. For the purpose of introducing this speed ratio the transmitting instruments are provided with a greater number of poles than are their receiving instruments. As shown (Fig. 9), the field member 135b of the transmitting instrument 135 is provided with twenty-four poles thereby rendering the transmitting instrument a twenty-four pole instrument, whereas the receiving instrument 137 is provided with but two poles. Similarly the transmitting instrument 136 is provided with twenty-four poles while its receiving instrument is provided with but two. It will be understood that in each self-synchronous motion transmission set, as for example that shown in Fig. 9, electromotive forces are induced in the circuits of the armature windings 135a and 137a of the transmitting and receiving instruments 135 and 137 by their associated field windings 135b and 137b since these field windings are supplied with alternating current. The armature and field members of the receiving instrument 137 tend to take up a position relative to each other such that the electromotive forces induced in the armature winding by the field winding are opposite to and match the electromotive forces induced in the armature of the transmitting instrument by its field winding. When the armature and field windings of the transmitting instrument are moved relatively to each other the electromotive forces induced in the transmitting armature winding are changed relatively in magnitude, with the result that an exchange of current takes place between the transmitting and receiving instruments due to the unbalanced voltage condition between the two instruments, whereby the armature and field windings of the receiving instrument tend to take up a new relative position in which position the electromotive forces are again opposite and matched. Due to the fact that the transmitting instrument has twenty-four poles, it will be observed that the electromotive forces induced in its armature winding will pass through a complete electromotive force cycle every $\frac{1}{12}$ of a revolution of relative movement between the armature and field windings, that is, starting with zero the electromotive force in any particular coil of the armature winding will increase in one direction to a maximum value, decrease to zero, and then increase in the opposite direction to a maximum value and decrease to zero again each $\frac{1}{12}$ of a revolution of relative movement between the armature and field windings. This cycle tends to produce a complete revolution of relative movement between the armature and field windings of the bi-polar receiving instrument. The result is that for each revolution of relative movement between the armature and field members of the transmitting instrument the receiving instrument will tend to rotate through twelve complete revolutions.

The receiving instruments 137 and 138, however, instead of measuring the angles α and β directly, are connected to control suitable servo-motors 140 and 141 respectively which will be utilized to measure convenient functions of these angles. As shown, the motors 140 and 141 are supplied electrically from the direct current supply source 60, and are provided with two oppositely wound series field windings 142, 142a and 143, 143a respectively. Each set of these windings is controlled by means of corresponding contact devices 144 and 145 whereby the starting, stopping and direction of rotation of the servo-motors are controlled in accordance with the operation of the self-synchronous motors 137 and 138.

The servo-motors 140 and 141 are provided with threaded shafts 146 and 147 respectively on which are threaded travelling nuts 150 and 151. These nuts are connected by means of suitable lever or crank arms 152 and 153 with the respective armature members of the receiving motors 137 and 138. The levers 152 and 153 are mounted on fixed pivots 152a and 153a respectively and are mechanically connected with their respective armature members 137a and 138a by means of gear connections comprising spur gears 152b and 153b arranged to rotate with the armature members and segmental gear members 152c and 153c arranged on the levers 152 and 153 to mesh with the spur gears. These gear connections are so arranged that the armature members 137a and 138a are turned through twelve times the angle of movement imparted to their respective levers 152 and 153. In other words, the levers 152 and 153 will be rotated by their motors 140 and 141 through angles equal in magnitude to the angles transmitted by the transmitting instruments 135 and 136 respectively. This arrangement is necessary because of the 12–1 ratio introduced between the transmitting and receiving instruments of the motion transmission sets. It will be observed that each lever 152, 153 has a sliding connection with its travelling nut which connection serves to prevent rotation of the nut on its shaft and thereby constrain the nut to move longitudinally on the shaft when the latter is rotated.

It will be understood that each contact device 144, 145 is mechanically connected with the field member of its associated receiving motor 137, 138 so that when this member is moved in one direction or the other in response to the operation of the corresponding transmitting generator 135, 136, a control circuit will be completed for the controlled servo-motor 140, 141. The servo-motor 140, 141 in response to the completion of this circuit will cause the associated nut 150, 151 to move longitudinally of its screw so as to impart rotary motion to its connected receiving motor armature. Moreover, it will be understood that the servo-motor 140, 141 will continue to rotate until the armature of the associated receiving motor 137, 138 has been moved to such an angular position with respect to its field that the matched voltage condition in the armatures of the receiving motor and its transmitting generator 135, 136 has been restored. When this condition has been established, the contact device 144, 145 will be returned to its neutral position so as to deenergize the associated servo-motor. In each case, therefore, when the armature of the receiving instrument has been moved by its servo-motor through an angle equal to twelve times the angular movement of its transmitting instrument, the servo-motor will be deenergized.

It will be observed that in either case when the armature of the receiving instrument 137, 138 has been rotated by its associated nut 150, 151 through an angle equal to twelve times the angle $\alpha$, $\beta$ through which the transmitter 135, 136 has been moved, the distance which the nut will have travelled on its shaft will be a measure of the tangent function of the angle $\alpha$, $\beta$. In other words, the angle $\alpha$ is converted to tan $\alpha$ in the screw shaft 146, while the angle $\beta$ is converted to tan $\beta$ in the screw shaft 147.

The tan $\alpha$ and $\beta$ movements of the shaft 146 and 147 respectively are applied to the lever mechanisms 46 and 47 so as to introduce the functions $\cos^3 \theta$ and $\cos^3 \beta$.

In order to introduce the function $\cos^3 \theta$, I have provided suitable cams 155 and 156 which serve to impart motion directly to the fulcrums 100 and 101 provided for the respective $\cos^3 \theta$ levers 94 and 95. As shown, these cams are mechanically connected to their associated fulcrums by means of cam rods 157 and 158, and are mechanically tied to each other by means of a shaft 160 so that it is merely necessary to impart motion to one or the other of the cams, or to the shaft, in order to control both fulcrums 100 and 101. As shown, the cam rods 157 and 158 are provided with suitable spring members 157a and 158a arranged to keep the rods bearing on their respective cams 155 and 156.

The cams 155 and 156 are suitably shaped and are controlled by the tan $\alpha$ and tan $\beta$ movements of the shafts 146 and 147 so as to give a ratio to the levers 94 and 95 which is proportional to $\cos^3 \theta$. For this purpose, I have provided a suitable motion transmitting mechanism which comprises a slider 161 in screw threaded engagement with the tan $\alpha$ shaft 146 and movable in suitable guides 162. This slider is connected with a similar slider 163 by means of a link 164 having an adjustable pivot 165. The latter slider is fixed to a rack 166 which meshes with a gear 167 arranged to turn the cam 155, and also the cam 156 through the shaft 160. The adjustable pivot 165 for the link 164 is mounted in a slider 168 movable in a guide 169 in a direction at right angles to the movements of the first mentioned sliders. The ratio of the lever 164 is kept proportional to $\cos \beta$ by means of a cam 170 which is connected to be operated by the tan $\beta$ screw 147. As shown, this cam is turned by means of a gear and worm drive 171, and motion is transmitted from this cam to the adjustable pivot 165 by means of a cam follower or rod 172. This rod is kept bearing on its cam 170 by means of a suitable spring member 172a or equivalent device.

It will be observed, in view of the foregoing arrangement, that the rack 166 has a movement that is always proportional to tan $\alpha \times \cos \beta$, which as will be observed in Fig. 1 is equal to tan $\theta$. The cams 155 and 156 by virtue of their shape and the tan $\theta$ movement which is applied to them move the fulcrums 100 and 101 to give a ratio to their associated levers 94 and 95 which is proportional to $\cos^3 \theta$.

The $\cos^3 \beta$ functions are applied to the lever mechanisms 46 and 47 directly from the tan $\beta$ shaft 147. These functions are applied to the fulcrums 98 and 99 provided for the $\cos^3 \beta$ levers 92 and 93 by means of suitable cams 173 and 174 respectively. As shown, these cams are mechanically connected with their respective fulcrums by means of cam rods 175 and 176, and are connected with each other by means of a shaft 177 so that it is only necessary to impart motion to one or the other of the cams, or to the shaft, in order to adjust both fulcrums 98 and 99. I impart motion from the tan $\beta$ shaft 147 directly to the cam 173 by means of a worm gear drive 178. It will be understood that the cams 173 and 174 will be suitably shaped so that they will translate the tan $\beta$ movement of the shaft 147 to move the fulcrums 98 and 99 to give ratios to their respective levers 92 and 93 proportional to $\cos^3 \beta$. Suitable spring members 175a and 176a are provided to keep the cam rods 175 and 176 bearing on their respective cams 173 and 174.

It will be observed in view of the foregoing discussion that the adjustments of the lever mechanism 46 and 47 interposed between the measuring springs 30 and 31 and the torque measuring motors 44 and 45 is partly at the will of the bomber and is partly automatic. And moreover, that the automatic adjustments of these lever mechanisms in response to the precession of the gyroscope 13 are such that the fore and aft and athwartship precession rates of the gyroscope are varied so that given settings of the measuring springs 30 and 31 shall correspond to a constant apparent linear speed of the target. Attention is again called to the fact that it is the apparent linear speed along the ground or water that is constant for constant conditions.

It is desirable that the proper sight offsets be deduced and applied so as to cause the bomb to be released at the proper time. It is also desirable that the bomber incidentally determine the proper sight offsets as he sets the measuring springs 30 and 31 to correspond to the constant apparent linear velocity components of the target.

It will be observed that if in the chains of levers 46 and 47, which introduce the factors $p$, $$\frac{1}{h}$$

$\cos^3 \theta$ and $\cos^3 \beta$ among the factors by which the measured forces of the springs 30 and 31 are to be multiplied to give the correct precession torques to the gyroscope 13, the factor $$\frac{1}{T}$$

in which T is the time of flight of the bomb for altitude $h$) be included, then the settings of the measuring springs will remain constant for constant velocity components $V_x$ and $V_y$ of the target's motion but will in fact measure $TV_x$ and $TV_y$, the components of the target's total motion during the interval from $t_r$, the time of release to $t_i$, the time of impact.

It will also be observed that $TV_x$ is the range forward plus the trail and $TV_y$ is the range athwartship.

Referring to Fig. 1 it will be understood that $$\frac{TV_x}{h} = \tan \alpha_r + \tan \text{ trail angle, and}$$

$$\frac{TV_y}{h} = \tan \beta_r$$

wherein, as has been pointed out, $\alpha_r$ is the range angle forward, or the value $\alpha$ must have at the instant of release, and $\beta_r$ is the range angle athwartship or the value $\beta$ must have at the instant of release.

It is to be remembered that $p$ has been so defined that $$p \cdot \frac{1}{h} = \frac{1}{T}$$

therefore, in these chains of levers 46 and 47 the group of factors becomes:

$$\frac{1}{T} \cdot \cos^3 \theta \cdot \cos^3 \beta$$

which is equal to $$p \cdot \frac{1}{h} \cdot \cos^3 \theta \cdot \cos^3 \beta$$

and the settings of the measuring springs 30 31 measure directly the quantities $\tan \alpha_r + \tan$ trail angle and $\tan \beta_r$, respectively. This is the complete explanation of the significance and utility of the factor $p$ introduced earlier in the specification.

The factor $$\frac{1}{T}$$

is introduced directly into the mechanisms by means of the adjusting screw 118. The proper adjustment of the screw 118 for the time of flight factor $$\frac{1}{T}$$

may be determined mechanically in terms of the altitude $h$ and the air speed S, it being understood that the time of flight is a joint function of the air speed and the altitude. The value of the air speed S, which will have been determined in any suitable manner, is set by the adjusting screw 180 on its associated scale 181. The effect of this setting is to adjust the position of the aperture 182, through which the altitude $h$ may be read on the associated scale 183, so as to permit the setting of the time of flight in terms of the altitude and air speed. It is assumed, of course, that the altitude $h$ will have been determined previously by any suitable means. Consequently the time of flight factor $$\frac{1}{T}$$

may be introduced in the mechanism merely by adjusting the screws 118 and 180 in accordance with the known values of air speed S and altitude $h$.

The effect of the adjustments of the time of flight screw 118 is to change the ratio of the lever arms A and B (Fig. 4) of the levers 90 and 91 in accordance with the following equation:

$$\frac{A}{B} = \frac{1}{T}$$

wherein A is the effective length of the lever arms between the fulcrums 96 and 97 and the points of connection between the levers 90 and 92 and 91 and 93 respectively, and B is the effective length of the lever arms between the fulcrums 96 and 97 and the points of connection between the levers 90 and the torque motor 44 and between the lever 91 and the torque motor 45 respectively.

In view of the fact that the lever mechanisms 46 and 47 are identical with respect to their construction, and in view of the fact that the fulcrums 96 and 97 of the two mechanisms always occupy the same positions relative to their associated levers 90 and 91, the following discussion of the mechanism for introducing the time of flight factor $$\frac{1}{T}$$

into the lever mechanisms will include only the lever mechanism 46 it being understood that adjustments of the time of flight screw 118 effects like controlling actions in both mechanisms 46 and 47.

It will be obvious that when the fulcrum 96 is in its mid position, or in other words, when the lengths of the arms A and B are equal to each other, the adjusting screw 118 will have been set so as to introduce into the lever mechanism 46 unit time of flight. The unit of time chosen may have any suitable value, the value chosen depending to some extent upon the length of the lever 90 and to some extent upon the maximum number of seconds time of flight that it is contemplated will have to be provided for, the important feature being that a relatively large portion of the length of the lever be utilized in effecting adjustments for time of flight between zero seconds and the maximum number of seconds to be provided for. Thus for example, if it be assumed that the greatest time of flight T to be provided for be forty seconds and that the lever have a length of four inches, a convenient unit of time is twenty seconds.

It will be understood that the fulcrum 96 for any particular time of flight T that must be provided for within the limits from zero to the maximum number of seconds will have to be adjusted so that the ratio of the lengths of the lever arms A and B will be equal to $$\frac{1}{T}$$

in accordance with the above equation:

$$\frac{A}{B} = \frac{1}{T}$$

wherein T is the particular time of flight in terms of the chosen unit. Let it be assumed for the purpose of explanation that the length of the lever 90 be four inches and that the maximum time of flight to be provided for be forty seconds. Having chosen a unit time of flight, such for example twenty seconds, it will be understood that it is necessary to determine just what position the fulcrum 96 will have to occupy for each particular time of flight T so that the ratio of lengths of the lever arms A and B in any case will be equal to $$\frac{1}{T}$$

or in other words, $$\frac{\text{unity}}{T}$$

wherein in the example given, unity equals twenty seconds. Suppose it be desired to determine the position of the fulcrum 96 to give proper lengths to the arms A and B for the maximum chosen time of forty seconds; then in accordance with the equation $$\frac{A}{B} = \frac{\text{unity}}{T}, \frac{A}{B} = \frac{20}{40} = \frac{1}{2}$$

In other words, for forty seconds time of flight T, the length of the arm A:length of the arm B::1:2; it will be obvious, therefore, that in a lever having a length of four inches the arm A for forty seconds time of flight T will be equal to 1.333 inches, whereas the length of the arm B will be equal to 2.666 inches, and that the fulcrum 96 must be moved to a position 2.666 inches below the joint 102 connecting the lever 90 to the torque motor 44 in order to introduce the factor $$\frac{1}{T}$$

into the lever mechanism 46.

Again, suppose that the time of flight T be equal to ten seconds; then in accordance with the equation $$\frac{A}{B} = \frac{\text{unity}}{T}, \frac{A}{B} = \frac{20}{10} = \frac{2}{1}$$

In other words, for ten seconds time of flight T, the length of the arm A:length of the arm B::2:1. In a lever four inches long A will be equal to 2.666 inches while B will be equal to 1.333 inches. In order to introduce the factor $$\frac{1}{T}$$

in the lever mechanism, therefore, the fulcrum 96 will be moved so as to occupy a position 1.333 inches below the joint 102.

Similarly for each particular time of flight T between zero and the maximum time of flight to be provided for the position which the fulcrum 96 must occupy so as to introduce into the lever mechanism the factor $$\frac{1}{T}$$

wherein T is the particular time of flight, may be calculated.

As has been pointed out, it is the function of the scales 181 and 183 to assist the bomber in adjusting the fulcrum 96 to the proper position to introduce the factor $$\frac{1}{T}$$

into the lever mechanisms in terms of the known data: the altitude $h$ and the air speeds of the airplane. As has also been pointed out, the scale 181 is graduated to indicate air speeds and the scale 183 is calibrated to indicate altitude $h$ in terms of the time of flight T for various air speeds so that the setting of the screw 180 to air speed automatically selects the proper altitude scale on the scale 183, whereby if the screw 118 be turned to indicate on this scale the actual altitude $h$ of the attacking airplane, the fulcrum 96 will be moved to such a position that the ratio of the lever arms A and B will be equal to $$\frac{1}{T}$$

The altitude scales for the scale 183 may be conveniently determined as follows: Let it be assumed for the purpose of explanation that one revolution of the drum on which the scale 183 is mounted provides for the total range of movement of the fulcrum 96. If it be assumed, as before, that the lever 90 has a length of four inches and that the maximum number of seconds time of flight to be provided for is equal to forty seconds, then it will be observed that one revolution of the drum or scale 183 corresponds to a movement of 2.666 inches of the fulcrum downwardly from the joint 102, which range of movement, as has been pointed out, will provide for any time of flight between zero seconds and the chosen maximum of forty seconds. With the above information, the portion of a revolution of the scale 183 corresponding to the position of the fulcrum 96 for any particular time of flight T so that the ratio of the lengths of the arms A and B is equal to $$\frac{1}{T}$$

may readily be determined. For example, suppose that it be desired to determine the portion of a revolution of the scale 183 corresponding to the position of the fulcrum 96 for ten seconds time of flight, which position, as has been determined above, is 1.333 inches below the joint 102. If X be assumed to be the portion of a revolution corresponding to this position of the fulcrum, then $$\frac{x}{1\text{ revolution}} = \frac{1.333''\text{(corresponding to 10 seconds)}}{2.666''\text{(corresponding to 40 seconds)}} = \frac{1}{2}$$

The scale, therefore, must be turned through one-half of a complete revolution in order to bring the fulcrum 96 to the proper position to introduce into the lever mechanism the factor $$\frac{1}{T}$$

wherein T is equal to ten seconds.

In like manner the portions of a complete revolution of the scale 183 corresponding to the positions of the fulcrum 96 for other particular times of flight T may readily be determined.

In certain instances it may be more convenient to determine the number of inches of movement on the circumference of the scale corresponding to the positions occupied by the fulcrum 96 for the various times of flight T. Then, if the circumference of the scale be 10", it will be obvious that the drum must be moved through 5" of circumference to bring the fulcrum 96 to a position 1.333 inches from the joint 102 so as to introduce into the lever mechanism the factor $$\frac{1}{T}$$

wherein T is equal to ten seconds; again, the drum must be moved through ten inches of circumference to bring the fulcrum to a position 2.666" below the joint 102 which position corresponds to the chosen maximum time of flight T of forty seconds. It will be obvious that the number of inches of circumference on the drum corresponding to other positions of the fulcrum for various times of flight T may be readily determined.

The altitude scales may readily be determined by plotting a curve with seconds time of flight and the corresponding inches circumference on the scale as coordinates. Referring to Fig. 10 such a curve is shown plotted with "Seconds time of flight" as ordinate and "Inches circumference on scale" as abscissa. The altitude scale for any particular air speed S may readily be determined from this curve and from the data available for any particular type of bomb with respect to the relationship existing between time of flight T and altitude $h$ for the particular air speed. Thus, the characteristics of the particular type of bomb determines for any particular air speed S the relationship existing between the altitude $h$ and time of flight T. Therefore, to determine the altitude scale for any particular air speed S it is merely necessary to select points on the above curve (shown in Fig. 10) so that the ordinates of the points chosen correspond in seconds to the times of flight for various altitudes at the chosen air speed. These points projected, as shown, on the axis of abscissas determine the inches circumference on the scale corresponding to the various altitudes represented by the points selected on the curve for the particular air speed chosen. Thus, for example, assume that it is known that for a particular air speed S and for an altitude of four thousand feet the time of flight T is sixteen seconds; if a point be selected on the above curve (Fig. 10) whose ordinate is sixteen seconds and if this point be projected on the abscissa, the portion of a revolution that the scale must be turned, measured in inches of circumference, in order to bring the fulcrum 96 to such a point along the lever 90 that the factor $$\frac{1}{T}$$

is introduced into the lever mechanism is determined.

Similarly altitude scales for other air speeds may be calculated. A series of these scales for air speeds ranging from sixty to one-hundred and forty knots is illustrated by way of example in Fig. 11, the composite scale being shown as a development of the drum.

It will be understood that the altitude scales for the various air speeds as shown in Fig. 11 will be arranged on the scale in accordance with the arrangement of the air speed indications on the scale 181 so that when the knob 180 is turned to bring the index associated with the scale 181 to any particular air speed, the proper altitude scale on the drum 183 will automatically be selected, whereby it is merely necessary for the bomber to adjust the screw 118 to bring the index of the scale 183 to the altitude at which the airplane is actually flying to introduce into the mechanism the proper factor $$\frac{1}{T}$$

corresponding to the air speed and altitude of the airplane.

It is also to be understood that the threaded connection between the adjusting screw 118 and the fulcrum 96 will be so arranged and proportioned to the geared connection between this screw and the drum 183 that when the drum is adjusted to indicate a given altitude for a particular air speed, the fulcrum 96 will be moved along the lever 90 to its proper position so as to introduce into the lever mechanism the factor $$\frac{1}{T}$$

wherein T corresponds to the altitude indicated on the scale.

It will also be understood that if different types of bomb be used altitude scales calibrated in accordance with the characteristics of the different types will be provided.

It is again pointed out that any adjustment of the screw 118 to move the fulcrum 96 relative to its lever 90 effects a like adjustment of the fulcrum 97 relative to its lever 91.

I provide suitable mechanisms for deducing the value of tan $\alpha_r$, i. e., the tangent of the range angle forward, and for continuously comparing the value of tan $\alpha$ with tan $\alpha_r$, as the battle action proceeds, and for deducing the value of tan $\beta_r$, the range angle athwartship, and for comparing tan $\beta$ with tan $\beta_r$ continuously as the battle action progresses, and when tan $\alpha$ becomes equal to tan $\alpha_r$, and if at the same time tan $\beta$ becomes substantially equal to tan $\beta_r$, I cause the bomb to be dropped automatically or cause a signal to be given that the proper time for the release of the bomb has arrived.

In order to deduce the value tan $\alpha_r$, I have provided a suitable differential gear arrangement 185 into which is introduced the factor $$\frac{TV_x}{h}$$

or its equivalent the tan $\alpha_r$+tan trail angle and also tan trail angle, the differential being arranged so that its output measures tan $\alpha_r$.

It will be observed that the setting of the adjusting screw 116, which measures directly tan $\alpha_r$+tan trail angle, is transmitted to one element of the differential 185 by means of a shaft 186 to which the screw 116 is suitably connected by means of bevel gears 187, and a shaft 188 connected by bevel gears 189 to the shaft 186 and by gears 190 to one side of the differential 185. The other differential input shaft 191 is controlled by means of an adjusting knob 192, and is connected with the differential by means of gears 193. As shown, the knob 192 is connected directly with the shaft 191. The adjusting knob 192 serves to generate in the differential the value of the tangent trail angle which is read in terms of altitude $h$ on a suitable scale 194 selected by the proper setting of the adjusting screw 180 to the value of the air speed S.

The altitude scales of the scale 194 are calibrated so as to give an indication of the amount or portion of a revolution that the scale must be rotated in order to introduce into the mechanism the tangent function of the trail angle corresponding to a given altitude and air speed for any particular type of bomb.

The movement of the scale 194 to introduce the tangent function of any particular trail angle may readily be determined by assuming that one or more or a portion of a revolution of the scale corresponds to the tangent function of the maximum trail angle that it is contemplated will have to be provided for, and then determining the fraction of this total motion that the scale must be moved so as to introduce the tangent functions of trail angles of lesser magnitude. For the purpose of explanation let it be assumed that the maximum trail angle to be provided for is 10°47′, or in other words, that the maximum tangent function to be provided for is .1902, and that one revolution of the scale will introduce this function into the mechanism. It will be obvious that the portion of a revolution that the scale must be turned so as to introduce the tangent function of a lesser trail angle will be proportional to the ratio of the tangent functions of the lesser trail angle and of the maximum trail angle. Thus for example, the portion of a complete revolution of the scale corresponding to a trail angle of 5° is $$\frac{.0875 \text{ (the tangent of } 5°)}{.1902 \text{ (the tangent of } 10°47′)}$$

which ratio equals .460. In other words, the drum must be turned through .460 of one revolution in order to introduce the tangent function of a 5° trail angle. In like manner the portions of a complete revolution of the scale corresponding to other trail angles to be provided for may readily be determined.

The altitude scales of the scale 194 may readily be calibrated by plotting a curve having as its coordinates, "Degrees trail angle" and "Inches circumference on scale" corresponding to the tangent functions of the trail angles, it being understood that whether inches circumference on scale or whether portions of a revolution of the scale be plotted is immaterial. Such a curve is shown in Fig. 12. As shown, "Degrees trail angle" is the ordinate, while "Inches circumference on scale" is the abscissa. In plotting this curve it is assumed for the purpose of explanation that the scale has a circumference of ten inches and that one revolution of the scale, i. e., ten inches of circumference, corresponds to the tangent function of a chosen maximum trail angle of 10°47′.

With the information which is available for any particular type of bomb with respect to the relationship existing between trail angle and altitude for various air speeds the altitude scales may readily be determined from the curve shown in Fig. 12. Thus, for a particular type of bomb and for a particular air speed S it is merely necessary to select points on the curve shown in Fig. 12 which points correspond to the trail angles for various altitudes $h$, the projections of these points on the axis of abscissas giving the locations of the altitude graduations on the scale for the particular air speed chosen. I have indicated in Fig. 12 the altitude scale as thus determined for one air speed. In like manner the altitude scales for various other air speeds may readily be determined.

In Fig. 13 I have illustrated by way of example a development of an altitude scale 194, the scale being provided with altitude scales for a number of air speeds ranging from sixty to one-hundred forty knots. It will be understood that these altitude scales are arranged on the scale or drum 194 so that the proper altitude scale will be selected automatically when the bomber sets the adjusting screw 180 to air speed S of the airplane, and that to introduce the tangent function of the trail angle corresponding to the altitude and air speed of the airplane, it is merely necessary to set the existing altitude on the selected altitude scale.

It will be understood that if different types of bombs be used altitude scales calibrated in accordance with the characteristics of the different types will be provided.

The output shaft 195 of the differential 185 measures the sight offset, tan $\alpha_r$. It will be observed, therefore, that the setting of the adjusting screw 116, together with the setting (generally at the beginning of the battle action) of the adjusting knob 192 to tangent trail angle automatically generates in the differential 185 the tangent of the range angle forward.

As has been pointed out, the setting of the measuring spring 31 by the adjusting screw 117 automatically measures the tangent of the range angle athwartship, i. e., tan $\beta_r$.

The tangent of the range angle forward $\alpha_r$ is subtracted in a differential gear 196 from tan $\alpha$, while the tangent of the range angle athwartship $\beta_r$ is subtracted from tan $\beta$ in a differential gear 197. It will be observed that the shaft 195, which measures tan $\alpha_r$, is connected to one element of the differential 196 by means of gears 198, and that the shaft 146, which measures tan $\alpha$ continuously as the battle action progresses, is connected with another element of this differential by means of a shaft 199. As shown, one end of this shaft 199 is connected by means of suitable bevel gears 200 with the tan $\alpha$ shaft 146 and its other end is connected by means of gears 201 with the differential 196. The movements applied to the differential 196 by the shafts 195 and 199 are subtracted in the differential so as to measure the difference between tan $\alpha$ and tan $\alpha_r$.

In like manner the tan $\beta$ shaft 147 is connected with one side of the differential 197 by means of a shaft 202, while the other side of this differential is connected directly with the adjusting screw 117 through the medium of suitable gears 203.

The output shafts 204 and 205 of the differentials 196 and 197 respectively are connected to control suitable switching devices 206 and 207 which will serve to control a controlling circuit either for a suitable bomb releasing mechanism (not shown) or for a suitable signal which will serve to indicate that the proper time for release has arrived.

I have shown diagrammatically in Fig. 5 a control circuit for a suitable bomb releasing mechanism (not shown). This circuit as shown comprises a suitable releasing coil 210 which when energized operates to effect a release of the bomb. The coil 210 is energized from a suitable direct current source of supply 211, the energization of this coil being controlled by the switches 206 and 207 so that when both switches are closed, as shown in Fig. 5, the coil will be energized to release the bomb. It will be observed that each of these switches is provided with a central contact arm 212 and with a pair of contact arms 213 disposed on opposite sides of the arm 212. These arms 213 are pivotally mounted, as shown, and are biased by means of a compression spring 214 toward a suitable stop 215. The arms 213 will be provided with adjusting screws 216 which will be set so that when both arms are clear of the stop 215 a circuit will be completed through the switch. The central arm 212 of the switch 206 is operated by means of the output shaft 204 of the differential 196, while the central arm of the switch 207 is operated by the output shaft 205 of the differential 197.

It will be understood that during the battle action, the arms 212 will hold one or the other of their associated arms 213 away from the stops 215, and that as the battle action progresses, the arms 212 will be moving toward their respective central positions each followed by one of the associated arms 213 while the other rests against the stop 215. The contacts of the switch 206 will be closed whenever tan $\alpha$ becomes equal to tan $\alpha_r$, and the contacts of the switch 207 will be closed whenever tan $\beta$ becomes equal to tan $\beta_r$ by reason of the fact that arm 212 touches the second arm 213 before the first has reached the stop 215. As has been pointed out, $\alpha_r$ is the sight offset forward and $\beta_r$ is the sight offset athwartship necessary to cause the sight to bear on the target when the airplane has reached the proper position to release the bomb to score a hit. It is proper to release the bomb, therefore, when both switches 206 and 207 have become closed.

One of the switches, as for example the switch 207, should preferably be given a small tolerance by suitable setting of the adjusting screws 216 so that the bomb will be released whenever tan $\alpha$ equals tan $\alpha_r$ even though tan $\beta$ has not attained the exact value of tan $\beta_r$. In other words, if the fore and aft angular coordinates of the range angle and of the target's position are equal, a slight difference in the values of the athwartship angular coordinates of the range angle and of the target's position will result in but a very small error in the accuracy of the aim; and under those conditions a release of the bomb is desirable, whereas it will not usually be possible, except by accident, to cause both tan $\alpha$ to equal tan $\alpha_r$ and tan $\beta$ to equal $\beta_r$ with great accuracy at the same instant. It is to be noted, however, that tan $\beta$ must not differ from tan $\beta_r$ by more than the predetermined tolerance set on the switch 207 when tan $\alpha$ becomes equal to tan $\alpha_r$, otherwise a failure to release will occur.

Preferably, the bomb releasing circuit will be provided with a suitable control switch 217 accessible to the bomber so that he may open the circuit and thereby prevent the release of the bomb if desired.

Obviously, it will be impossible for the angles $\alpha$ and $\beta$ to become equal to the range angles forward and athwartship at the same time unless the pilot has the airplane on a right course for a hit. In order to enable the pilot to steer the airplane in the proper direction I have provided suitable pilot directing mechanism.

The theory of the pilot directing mechanism may be best understood by reference to Figs. 1 and 2. Attention is again called to the fact that Fig. 1 illustrates the various elements of the problem shown quantitatively as they would appear to the bomber at the instant of release of the bomb and that the airplane is assumed to be stationary, the target having the total motion relative to the airplane; while in Fig. 2 the elements are illustrated as seen from the target, i. e., the target is assumed to be stationary, and the airplane is assumed to have the total motion relative to the target. In other words in Fig. 2, the airplane is assumed to have a motion component forward through the air due to its own propulsive force, which as will be readily observed, is the vector $\overline{ST}$, and also has the motion of the air relative to the target which is represented by the apparent wind vector $\overline{WT}$. The resultant of these components, of course, is the airplane's apparent motion as viewed from the target.

As will be observed readily by reference to Fig. 1, the distance the target is forward from the origin O is:

$h$ (the altitude) $\cdot \tan \alpha$

The distance the target is forward from "the point of impact" is:

$h \cdot \tan \alpha + h \cdot \tan$ trail angle and since $h$ is taken as the unit, the distance the target is forward from "the point of impact" is:

$\tan \alpha + \tan$ trail angle

In like manner, it will be observed that the distance the target is athwartship from "the point of impact" is:

$\tan \beta$

The initial bearing of the target, therefore, from from the initial position of "the point of impact" P (Fig. 2) measured with reference to the initial direction of the fore and aft axis OX, is:

$$\frac{\tan \beta \text{ (initial)}}{\tan \alpha \text{ (initial)} + \tan \text{ trail angle}}$$

which expression as will be observed (Fig. 2) is the tangent function of the angle $\phi$.

Attention is again called to the fact that the trail is the fixed distance back along the OX axis from the vertical OZ axis that the bomb would travel of it were dropped from the airplane without regard to whether the vertical axis OZ is stationary or moving in the particular system of coordinates used and that it is assumed that "the point of impact" P is a point at the limit of the trail, fixed with respect to the airplane and moves with it, all without regard to whether or not the bomb be actually dropped and thus the trail and point of impact be physically marked out by the bomb. This is consistent with the assumption with respect to Fig. 1 that the airplane is stationary in the system of coordinates employed and the only motions therein are those of the target and bomb with respect to the airplane.

It will be understood that in order to score a hit $$\frac{\tan \beta}{\tan \alpha + \tan \text{ trail angle}}$$

which equals tan $\phi$, must at the instant of release equal the quotient of the velocity components of the target's apparent motion, viz., $$\frac{\text{apparent linear speed of the target athwartship}}{\text{apparent linear speed of the target fore and aft}}, \text{ i. e. } \frac{V_y}{V_x}$$

which quotient, it will be observed, is the tangent of the direction angle of the apparent path of motion of the target, i. e., tan $\phi'$, as shown in Fig. 2, or in other words, of the apparent course of the target, measured with respect to the fore and aft line of the airplane. If this equality does not exist at the instant of release the bomb will miss the target. In other words, it is necessary that the path of the apparent motion of the target coincide with the bearing of the target, as measured with respect to "the point of impact" from the fore and aft line OX, or it is necessary that the airplane be given such a heading that "the point of impact" will lie upon the apparent path of motion of the target.

The apparent linear speed $V_y$ of the target athwartship equals the rate of variation of tan $\beta$ times the altitude $h$, while the apparent linear speed of the target fore and aft $V_x$ equals the rate of variation of tan $\alpha$ times the altitude $h$. The former product will now be termed the $\beta$ rate, and the latter will now be termed the $\alpha$ rate. It will be observed by reference to Fig. 2 that $$\frac{\beta \text{ rate}}{\alpha \text{ rate}} = \tan \phi'$$

Therefore, in order that a hit may be scored it is necessary that tan $\phi$ be equal to tan $\phi'$ at the instant of release.

It is the function of the pilot directing mechanism to compare the angles $\phi$ and $\phi'$ as the battle action progresses and to signal the outstanding difference between these angles continuously to the pilot. The pilot directs the airplane either to the right or to the left as is necessary to annul this difference and thereafter to keep it at zero. Whenever the difference $\phi - \phi' = 0$ or $\phi = \phi'$ (assuming the bomber has the target stationary on the cross wires of his sight) the pilot is on a proper course for a hit, and, if he keeps on that course, tan $\alpha$ and tan $\beta$ will become equal to tan $\alpha_r$ and tan $\beta_r$ at the same time and release will occur automatically, or as has been pointed out, a suitable signal may be given that the time for release has arrived.

Referring to Fig. 4 and more particularly to Figs. 6, 7 and 8, the pilot director comprises a mechanism 220 in which the angle $\phi$ is generated, and a mechanism 221 in which the angle $\phi'$ is generated, these mechanisms being operably associated with each other so that the angles $\phi$ and $\phi'$ are continuously compared as the battle action progresses.

As shown Fig. 6, the mechanism 220 comprises a measuring arm 222 rigidly secured to a suitable pin or shaft 223. This shaft is provided with a bearing in a fixed supporting member 224 (Fig. 4). The arm 222 measures the angle $\phi$ as the battle action progresses.

It will be observed that the mechanism 220 in addition to the arm 222 comprises a suitable frame 225 mounted to move horizontally, as viewed in Fig. 6, suitable rails 226 being provided for supporting and guiding the frame in its horizontal movement. The frame 225 is mechanically connected with the measuring arm 222 by means of a pair of sliding blocks 227 and 228 which are pivotally connected together by means of a pin 230. As shown the block 227 is mounted to move in suitable guides 231 provided for it in the arm 222 and extending longitudinally thereof, while the block 228 is mounted to move vertically, as viewed in Fig. 6, in the frame 225. Vertical motion is imparted to the block 228 by means of a suitable screw 232 mounted vertically in the frame 225. The screw 232 is provided with an operating shaft 233 to which it is connected by means of suitable bevel gears 234. The shaft 233 is suitably supported so that the frame 225 may be moved longitudinally thereof. As shown, the bevel gears 234, which serve to connect the screw 232 with its operating shaft 233, are mounted to move with the frame 225, the gear of this mechanical connection which is associated with the operating shaft 233 being mounted to slide thereon but being keyed or otherwise suitably locked with it so that it is caused to rotate as the shaft is turned.

It will be observed that by reason of this arrangement the arm 222 can be moved about its pivot either by imparting vertical motion to the block 228 or by imparting horizontal motion to the frame 225, or by imparting motion to both of these members simultaneously. It will also be observed that if the block 228 be moved vertically from the height of shaft 223 a distance proportional to tan $\beta$ and if the frame 225 be moved horizontally from the longitudinal position of shaft 223 a distance proportional to tan $\alpha$ + tan trail angle, the arm 222 will automatically generate the angle $\phi$, since as has been pointed out the ratio, $$\frac{\tan \beta}{\tan \alpha + \tan \text{ trail angle}}$$

is equal to tan $\phi$.

The vertical movement of the block 228 is effected by means of the tan $\beta$ shaft 147 (Fig. 4). As shown this shaft is mechanically connected with the operating shaft 233 provided for the screw 232 by means of a shaft 235 which is geared to the shaft 147 by means of suitable bevel gears 236 and with the shaft 233 by means of suitable bevel gears 237.

The horizontal movement of the frame 225 is effected by means of a suitable operating screw 240 which is in screw threaded engagement with a portion provided for it in the frame 225. This screw is the output element of a suitable differential 241. Into one side of this differential is introduced the function tan $\alpha$ and into the other side of this differential is introduced the function tangent trail angle so that the output shaft or screw 240 measures tan $\alpha$ + tan trail angle. The tan $\alpha$ shaft 146 (Fig. 4) is mechanically connected with one element of the differential 241 by means of a shaft 242, to which the shaft 146 is connected by suitable bevel gears 243, and by means of a shaft 244 (Fig. 6), which is mechanically connected at one end to its element of the differential by means of spur gears 245, and at its other end to the shaft 242 by means of suitable bevel gears 246. The tangent trail angle function is introduced into the differential 241 by means of the adjusting screw 192, and is automatically introduced at the same time that this function is introduced into the differential 196 provided for the releasing contact 206. It will be observed (Fig. 4) that the adjusting screw 192 is mechanically connected with the differential 241 by means of a pair of shafts 247 and 248, these shafts being mechanically interconnected by means of suitable bevel gears, as shown. The shaft 247 is connected by means of bevel gears 247a to the adjusting knob 192, while the shaft 248 is connected by suitable bevel gears 249 (Fig. 6) with its element of the differential 241.

In view of the foregoing arrangement it will be observed that the vertical motion of the block 228 will measure tan $\beta$ continuously as the battle action progresses, while the horizontal motion of the frame 225 will measure tan $\alpha$ + tan trail, and consequently the resulting motion imparted to the arm 222 will measure the angle $\phi$ continuously as the battle action progresses.

In a similar manner the mechanism 221 (Fig. 7) measures the angle $\phi'$ continuously as the battle action progresses. This mechanism is provided with a measuring arm 250 rigidly secured to a shaft 251 which in turn is mounted in a suitable bearing provided for it in a fixed frame 252 (Fig. 4). A suitable block 253 is mounted to slide in a suitable guide way 254 provided for it in the arm 250, this guide way as shown extending longitudinally throughout the length of the arm. The block 253 is pivotally connected to a block 255 that is mounted to move vertically in a frame 256. As shown this frame is mounted to move horizontally, as viewed in Fig. 7, on suitable guide rails 257. The block 255 is provided with a suitable operating screw 258 in threaded engagement with the block, and the frame 256 is provided with a similar operating screw 259. The screw 258 is operated by means of a shaft 260 which is suitably supported so that the frame 256 may be moved longitudinally thereof. As shown, the shaft 260 is operably connected with the screw 258 by means of suitable bevel gears 261. These gears move with the frame 256, the gear member, which is rotated by the shaft 260, being mounted on the shaft so that it is free to slide thereon but being keyed or otherwise suitably locked so that it is forced to rotate with the shaft.

It will be observed that if the block 255 be given a vertical motion proportional to the $\beta$ rate, and if the frame 256 be given a horizontal motion proportional to the $\alpha$ rate, each motion being reckoned from a point opposite shaft 251, then the arm 250 will measure directly the angle $\phi'$, since as has been pointed out:

$$\frac{\beta \text{ rate}}{\alpha \text{ rate}} = \tan \phi'$$

As has been pointed out in a previous portion of this specification, the settings of the adjusting screws 116 and 117 to keep the line of sight on the target automatically measure the respective velocity components $V_x$ fore and aft and $V_y$ athwartship of the target's apparent motion. Therefore, these settings also measure the $\alpha$ and $\beta$ rates. The $\alpha$ rate is transmitted from the adjusting screw 116 (Fig. 4) to the operating screw 259 provided for the frame 256 by means of the shaft 186. As shown this shaft is mechanically connected by means of suitable bevel gears 262 with a shaft 263 interposed between the screw 259 and its operating shaft 186. As shown, the shaft 263 is operably connected with the shaft 259 by means of suitable bevel gears 264. The $\beta$ rate is transmitted to the operating shaft 260 provided for the block 255 from the adjusting screw 117 by means of a mechanical connection comprising a shaft 265 (Fig. 4) connected at one end by means of suitable bevel gears 266 with the screw 117, and at its other end by means of similar gears 267 with another shaft 268; this shaft 268 is mechanically connected with the frame operating shaft 260 by a suitable bevel gear drive 269.

It will be observed, therefore, that when the bomber adjusts the screws 116 and 117 so as to keep the line of sight on the target, he incidentally introduces into the mechanism 221 the $\alpha$ and $\beta$ rates which mechanically translates them to generate the angle $\phi'$.

The mechanisms 220 and 221, which measure the angles $\phi$ and $\phi'$ respectively are provided with suitable means for automatically comparing the values that these angles attain as the battle action progresses, and for transmitting the outstanding difference between them to the pilot. This means comprises a suitable arc-shaped resistance member 270 (Figs. 4, 7 and 8) which is connected to be operated by the shaft 251 provided for the angle $\phi'$ measuring arm 250, and suitable contact arm 271 for the resistance member operated by the shaft 223 provided for the angle $\phi$ measuring arm 222. It will be observed that the shafts 223 and 251 are in accurate alignment (Fig. 4) so that the resistance element 2 is caused to move in a circle whose center is the pivotal mounting provided for the contact arm 271.

The contact arm 271 is electrically connected by means of a conductor 272 (Fig. 8) to one side of a suitable indicating galvanometer 273, the other side of which is connected by means of conductor 274 to the mid portion of a suitable block of resistance 275. This resistance, as shown is connected across a suitable source of electrical supply 276, which if desired may be the direct current source 60 or the source 61. either source be used, it is preferable to insert suitable additional current limiting resistor 27 between the source and the resistance block 27 A suitable control switch 278 is inserted in the connections leading from the source to the galvanometer.

As will be readily understood if the contact arm 271 is in its neutral position as shown in Fig. so as to balance the resistance portions on each side of it, no current will flow in the galvanometer circuit. In other words, if the angle $\phi$ equals the angle $\phi'$ there will be no indication on the galvanometer. However, if these angles do not equal each other the contact arm 271 will not be in its neutral position as shown in Fig. 8 but will be on one side or the other of this neutral position, whereupon a current will be caused to flow through the indicating galvanometer. The amount of this current will be related directly to the displacement of the contact arm 271 from its neutral position, and also will flow in a direction corresponding to this displacement. Therefore the galvanometer reading will be a correct indication of the outstanding difference between the angles $\phi$ and $\phi'$. Preferably the galvanometer will be calibrated so that small differences between the angles $\phi$ and $\phi'$ will give moderately large deflections, while larger differences between these angles will not give deflections proportionally a large.

It will be understood that the galvanometer 273 will be located so that it can be easily seen by the pilot. The switch 278 will be accessible to the bomber so that he can control the galvanometer circuit as he sees fit. Preferably the pilot will be provided with a suitable indicator such as an incandescent lamp 279 which will be connected so that it will be energized when the bomber closes the switch 278. As shown, the lamp 279 is connected across the source 276 so that when the switch 278 is closed the lamp will be energized. The lamp 279, therefore, together with the switch 278 constitute a signal circuit whereby the bomber can signal "attention" to the pilot.

In the operation of my bomb sight mechanism it is contemplated that the pilot will direct the airplane to take up a straight course prior to the release of the bomb.

When ready to begin the attack, the bomber will set the adjusting screw 180 to the value of the air speed of the attacking airplane; the he will set the adjusting screw 118 to the time of flight of the bomb, which will be read as altitude on the scale 182; after which he will set the adjusting screw 192 to tangent trail angle, which he will read as altitude on the scale 194. These settings are preliminary and need not be referred to again unless the altitude or the air speed changes from the values which have been introduced into the mechanism, in which event the settings will be changed accordingly.

The pilot, who may be guided by the bomber, approaches a position for beginning the battle action by any arbitrary path but seeks, if practical, a position "up-wind" from the target rather than a position "down-wind" from the target.

Let it be assumed that the airplane has reached the position for beginning the action, for example assume "the point of impact" to be at P (Fig. 2). The bomber will then bring the target into his field of vision by means of the joker switches 62 and 63, and will then adjust the rate screws 116 and 117 until the target is substantially stationary in his field of vision. When the target has thus been rendered stationary in the field of vision the bomber will again operate the joker switches 62 and 63 so as to bring the target on to his athwartship and fore and aft cross wires. As has been pointed out in a previous portion of this specification, the bomber in adjusting the screws 116 and 117 to bring the target stationary in his field of vision, incidentally will have introduced into the mechanism the initial values of $\alpha$ rate and $\beta$ rate as shown at P (Fig. 2). Thus, the bomber in bringing the target onto his crosswires and adjusting to keep it there will have set up the initial values of the $\alpha$ and $\beta$ rates in the mechanism 221 which utilizes these factors to measure the angle $\phi'$; and will have introduced into the differential 185 the factor tan $\alpha$ + tan trail angle, while the factor tan $\beta$ will have been transmitted to the differential 197.

When the airplane has carried "the point of impact" to the point P, and the preliminary adjustments of the screws 116 and 117 have been made, the bomber will signal "attention" to the pilot by closing the switch 278, provided for the pilot indicator 273, so as to effect the energization of the signal lamp 279. It will be understood that while the initial value of the angle $\phi'$ will have been measured in the mechanism 221 by the preliminary setting of the rate screws 116 and 117, the mechanism 220 will be measuring the angle $\phi$ continuously as the battle action progresses. As soon as the bomber closes his switch 278, the outstanding difference between the values of the angles $\phi$ and $\phi'$ will appear on the pilot's indicator 273.

It will be observed that when "the point of impact" is at the point P and the airplane is headed in the direction indicated in Fig. 2, the angles $\phi$ and $\phi'$ will not be equal; in other words the quotient:

$$\frac{\tan \beta \text{ initial}}{\tan \alpha \text{ initial} + \tan \text{ trail angle}}$$

will not equal the quotient of the initial velocity components, i. e., $$\frac{\beta \text{ rate initial}}{\alpha \text{ rate initial}}$$

Therefore, an indication will appear on galvanometer 273 from which the pilot may correctly infer that the airplane is not on a proper course for a hit, which is to say the airplane is not on a collision course.

It will also be observed that the apparent wind vector WT, which in fact is a measure of one of the components of the target's apparent velocity, but which in Fig. 2 is assumed to be taken by the airplane, always has the same direction irrespective of the heading of the airplane. Assuming that the lengths of the vectors WT and ST remain constant, it will be understood that it is necessary to direct the airplane along such a course that the angle $\omega$ between the vector WT and the fore and aft axis OX, which angle measures the relative direction of the apparent wind at the target, will attain a value such that the angles $\phi$ and $\phi'$ will become equal. In other words, it is necessary to direct the airplane so that the two velocity components WT and ST will assume such positions relative to each other that the quotient of the velocty components athwartship and fore and aft of their resultant, i. e., $$\frac{\beta \text{ rate}}{\alpha \text{ rate}}$$

will equal and remain equal to the quotient of the components of the bearing of the target measured from "the point of impact," i. e., $$\frac{\tan \beta}{\tan \alpha + \tan \text{ trail angle}}$$

When "the point of impact" is at the point P, the pilot will be informed by the indicator 273, that he must turn the airplane sharply toward the right, as viewed in Fig. 2. The pilot in response to this indication will turn toward the right and fly in a curved path, as shown until he arrives at some point, for example such that "the point of impact" is at P'.

During this stage of the approach, the bomber will observe a tendency of the $\alpha$ and $\beta$ rates to change because of the changing relative direction of the apparent wind vector WT. The bomber, therefore, will manipulate the $\alpha$ and $\beta$ rate adjusting screws 116 and 117 and will endeavor thereby to keep the target stationary in his field of vision, while the pilot will be reducing the outstanding difference between the angles $\phi$ and $\phi'$. The bomber during the first portion of this stage of the approach will make comparatively rough and rapid adjustments of the rate screws 116 and 117 but during the final portion of this stage of the approach will refine his adjustments, until when "the point of impact" has reached the point P' he will discover that the target remains stationary on the cross wires of his sight without further adjustments by him, because the angles $\phi$ and $\phi'$ have become equal, the indication of outstanding difference has disappeared from galvanometer 273, and the pilot will accordingly have ceased to turn the airplane. Providing the pilot maintains a straight course from this point, there will be no further tendency for the $\alpha$ and $\beta$ rates to change and the airplane will be on a collision course, i. e., on a proper course for a hit.

In other words, during the portion of the airplane's approach from the point P to the point P' the pilot will have been directed to steer the airplane in such a direction that the angle $\omega$ will have attained the necessary value to cause the quotient $$\frac{\beta \text{ rate}}{\alpha \text{ rate}}$$

to equal the quotient $$\frac{\tan \beta}{\tan \alpha + \tan \text{ trail angle}}$$

It is contemplated that the bomber will have a telescope provided with two powers, a low power and a high power. Up to the stage in the battle action wherein the airplane is approaching the point P the bomber probably will use his low power adjustment. However, when the airplane arrives at the point P' or is in the vicinity of this point he will change to the high power adjustment of his telescope in order to refine his adjustment of the rate screws 116 and 117 with comparatively great accuracy and so that he may do so within a very short interval of time.

As soon as the rate screws 116 and 117 have been finally adjusted so as to maintain the line of sight on the target, and the pilot has his indicator 273 at zero, the conditions here shown in Fig. 2 at the point P' will exist. At this point the α and β rates will cease to change, i. e., they will have reached their final values; the pilot can maintain his indicator on zero merely by flying a straight course in his present heading; the line of sight is automatically maintained on the target by the precession of the gyroscope 13; and the angle φ, which will have become equal to φ' will remain equal to φ'. The pilot, by merely steering the airplane to maintain his indicator 273 on zero, flies on a straight course from the point P' to "the point of impact" P'', while nothing remains for the bomber to do. He may, however, utilize the time further to refine his adjustments, or he may give his attention to other duties, such as defending the airplane.

As has been pointed out in a previous portion of this specification, the setting of the α rate adjusting screw 116 measures directly tan $α_r$ + tan trail angle. This quantity as has been pointed out, is transmitted to the differential 185 in which mechanism the quantity tan trail angle, which has been introduced by the adjustment of the knob 192 to tan trail angle, is subtracted so that the output shaft 195 of this differential measures tan $α_r$ i. e., tan range angle forward. The setting of the β rate adjusting screw 117 generates in the differential 197 the value of tan $β_r$, i. e., tan range angle athwartship.

As the airplane carries "the point of impact" from the point P' to the point P'', the tangent functions of the angles α and β are introduced automatically into the differentials 196 and 197 from the tan α and tan β shafts 146 and 147 respectively, and in these differentials are continually compared with the tangents of the range angles forward and athwartship. When the airplane has carried "the point of impact" to P'' the angles α and β will have become equal to the range angles $α_r$ and $β_r$ respectively and the differentials will operate the contact devices 206 and 207 to close. The contact devices by closing will complete the energizing circuit for the bomb releasing coil 210 or if desired, as has been pointed out, will operate a suitable signal that the time for release has arrived. The bomber, if for any reason he desires to do so, can prevent the release of the bomb by opening the releasing circuit by means of the switch 211.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In sighting mechanism and the like for airplanes and like aircraft, a sighting device, a pair of spring members arranged to generate measured forces, means interposed between said spring members and said sighting device arranged to transmit and apply said measured forces to m said sighting device fore and aft and athwarts to maintain it on a target which has a subst tially constant apparent linear velocity and me responsive to the fore and aft and athwarts coordinates of the angular position of said sig ing device for controlling the forces applied said spring members to move said sighting vice so that constant settings in the forces plied by said spring members correspond to fore and aft and athwartship components spectively of the target's apparent linear veloc 2. In sighting mechanism and the like for planes and like aircraft, a sighting device ranged to be directed on a target and the l and means for operating said sighting device for measuring the apparent speed of said tar comprising means for generating substanti constant selected measured forces of vary magnitude, means for applying the force ger ated by said force generating means to m said sighting device, and means automatically sponsive to the angular position of said sight device controlling the application of said for so that said device is caused to move at a va ing angular rate which is dependent upon constant force which is selected to be genera by said force generating means to move s sighting device, whereby the force generated c responds to and measures the apparent lin velocity of said target.

3. In sighting mechanism and the like for planes and like aircraft, a sighting device mou ed for angular movement so that it can be rected on a target and like object, resilient me for generating substantially constant for means for adjusting the values of the forces g erated by said resilient means, means for plying the forces generated by said resili means to move said sighting device, and me operated responsively to the angular positior said sighting device controlling said apply means to apply said forces so that an actual force of varying magnitude is applied to ca said sighting device to move at a varying angı rate, the rate being dependent upon said adjı ments of said resilient means to generate c stant forces in such manner that said adjustme are a measure of the speed of a target mov with an apparent constant linear velocity.

4. In sighting mechanism and the like, a sig ing device mounted for angular movement ab a pair of axes so that it can be directed o target, a gyroscope arranged for precession ab axes corresponding to and parallel with the a of said sighting device, a driving connection tween said gyroscope and said sighting de whereby said sighting device is caused to m about its axes by the precession of said gy scope about its axes, a pair of spring memk for generating substantially constant measu forces, means for adjusting said spring me bers, means including lever mechanisms inl posed between said spring members and axes said gyroscope for applying to said last nar axes measured precessing torques and means controlling the effective leverages of said le mechanisms responsively to the angular posit of said gyroscope about said last named axes that said gyroscope is caused to move said sig ing device about its axes at varying angular ra the rate at which it moves about each axis be dependent upon the adjustment of the cor sponding spring member so that said adjı ment is proportional to the velocity compon arallel with the related torque axis of a target moving with apparent constant linear velocity.

5. In sighting mechanism and the like, a sighting device arranged for angular movement so that it can be directed on a target, a gyroscope, a driving connection between said gyroscope and said sighting device so that the motion of the line of sight of said sighting device is controlled by the precession of said gyroscope, means dependent upon the angular position of said gyroscope for applying to said gyroscope a measured varying precessing torque whereby said gyroscope is precessed in accordance with the apparent motion of a target and like object and means for rendering said torque applying means ineffective at will and for applying to said gyroscope a precessing torque of substantially constant value.

6. In sighting mechanism and the like, a sighting device arranged for angular movement so that it can be directed on a target, means including motive power means for imparting motion to said sighting device whereby the motion of its line of sight is controlled, means operated responsively to said sighting device as its position is changed controlling the operation of said motive power means so that said motive power means moves the line of sight of said device at varying angular rate to maintain it directed on a target having a constant linear velocity, and means for rendering said controlling means ineffective at will and for causing said motive power means to move said sighting device at a substantially constant angular rate.

7. Sighting mechanism comprising a sighting device, a gyroscope arranged to precess about a plurality of axes, a driving connection between said gyroscope and said sighting device so that the line of sight of said sighting device is maintained substantially parallel with the spin axis of said gyroscope, electric motors operably connected to apply precessing torques to precess said gyroscope about said axes and means for controlling said motors so as to apply measured precessing torques to said gyroscope.

8. Sighting mechanism and the like comprising a sighting device arranged to be directed on a target, a gyroscope mounted for angular precessing motion about axes, driving connections between said gyroscope and said sighting device whereby the direction of motion of the line of sight of said sighting device is controlled by the precession of said gyroscope, electric motors connected to apply precessing torques to precess said gyroscope about its respective axes, and means operably associated with said gyroscope so as to be continuously operated responsively to its angular position for controlling said motors.

9. Sighting mechanism comprising a sighting device, a gyroscope, a driving connection between said gyroscope and said sighting device whereby the line of sight of said sighting device is maintained substantially parallel with the spin axis of said gyroscope, means controlling the precession of said gyroscope in accordance with the apparent motion of a target and like object whereby the line of sight of said sighting device is maintained on said target, means for establishing a standard of vertical, and means for measuring the angular position of said target with reference to vertical at said sighting device comprising motion transmitting devices operably associated with axes of said gyroscope, each of said devices having a pair of relatively movable members, one of said members of each device being moved angularly in accordance with the angular movement of said gyroscope about one of said axes and the other being operably associated with said vertical establishing means so as to be held in a fixed angular position in space.

10. Sighting mechanism for airplanes and like aircraft comprising a sighting device mounted for angular movement about axes arranged fore and aft and generally athwartship, a gyroscope mounted for angular precessing motion about axes arranged parallel to said axes of said sighting device, a driving connection between said sighting device and said gyroscope whereby the line of sight of said sighting device is maintained substantially parallel with the spin axis of said gyroscope, means for applying to said gyroscope measured precessing torques in accordance with the apparent motion of a target and like object so as to maintain said line of sight on said target, and means for measuring the angular position of said target with reference to a vertical at said airplane comprising a neutrally suspended gyroscope mounted for angular precessing motion about axes arranged fore and aft and athwartship, means for applying to said gyroscope a corrective precessing torque whereby the spin axis of said gyroscope is maintained vertical, a pair of motion transmitting devices having inductively associated armature and field windings operably associated with fore and aft and athwartship axes of said first gyroscope so that one of the windings of each of said devices is moved angularly through space in accordance with the angular motion of said gyroscope about the corresponding axis, and operably associated with the respective axes of said second gyroscope so that the other of the windings of each of said devices is maintained in a fixed angular position in space, and a pair of motion-receiving devices having inductively associated armature and field windings electrically connected to said transmitting devices respectively so as to reproduce the angular relative motion between the windings thereof.

11. In combination, a gyroscope arranged for precession about a predetermined axis, a motor operably associated with said gyroscope to apply a precessing torque thereto about an axis perpendicular to said predetermined axis so as to cause said gyroscope to precess about said predetermined axis, a second motor electrically connected to said first motor so that the torque of said second motor bears a determinate relation to the torque of said first named motor and means for measuring the torque of said second motor.

12. A sighting mechanism and the like comprising a sighting device arranged to be directed on a target, a gyroscope mounted for precessing motion about a pair of axes, driving connections between said gyroscope and said sighting device whereby the motion of the line of sight of said sighting device is controlled by the precession of said gyroscope, a pair of motors connected to apply precessing torques to axes of said gyroscope to cause it to precess about said first named axes, a pair of dynamoelectric machines for measuring the currents supplied to said torque application motors respectively, a pair of resilient members, means including lever mechanisms interposed between said resilient members and said dynamo-electric machines so that the forces generated by said resilient members are applied to oppose the torques exerted by said dynamo-electric machines, means for varying the effective leverages of said lever mechanisms continuously in accordance with the angular position of said gyroscope on said last named axes, means for controlling said dynamo-electric machines in accordance with the variations in said lever mechanisms respectively so that currents are supplied to said machines to develop sufficient torque to balance the forces generated by said resilient members, and electrical connections between said dynamo-electric machines and said torque application motors respectively whereby the currents supplied to said motors are proportional to the currents supplied to their respective dynamo-electric machines.

13. Sighting mechanism for directing a projectile on a target comprising a sighting device, a gyroscope, a driving connection between said sighting device and said gyroscope whereby the line of sight of said sighting device is maintained substantially parallel with the spin axis of said gyroscope and force applying means responsive to the position of said sighting device for applying measured precessing torques to said gyroscope so as to control the motion of the line of sight of said sighting device and means for correcting the force applied by said force applying means in accordance with the time of flight of said projectile.

14. Sighting mechanism for dropping projectiles from airplanes and like aircraft comprising a sighting device arranged to be directed on a target and like object, mechanism for imparting motion to said sighting device including force generating means, means operably associated with said force generating means and said sighting device for transmitting the forces generated to move said sighting device, means responsive to the position of said sighting device for controlling the forces transmitted so that the line of sight of said sighting device is caused to move at a varying angular rate in accordance with the adjustments of said force generating means so as to maintain said line of sight on a target having an apparent constant linear velocity, and means for correcting said transmitted forces in accordance with a function of the time of flight of a projectile released from said airplane so that the adjustments of said force generating means measure the target's total motion during the interval of time measured by said time of flight.

15. Sighting mechanism for directing a projectile on a target comprising a sighting device, speed measuring means connected to said sighting device to move it, means connected to said sighting device and to said speed measuring means controlling said speed measuring means automatically as the angular position of said sighting device is changed so as to cause said speed measuring means to maintain said sighting device on a target and means for introducing a correction for time of flight of said projectile into said speed measuring means so as to measure the target's total motion during said time of flight.

16. Sighting mechanism for directing a projectile on a target comprising a sighting device, speed measuring means for moving said sighting device operably associated with said sighting device so as to be operated responsively to its angular position to maintain said sighting device on a target and means for introducing a correction for time of flight of said projectile into said speed measuring means so as to determine the target's total motion during said time of flight.

17. Sighting mechanism for directing a projectile on a target comprising a sighting device, speed measuring means including force generating means and connecting means between s force generating means and said sighting dev for applying the forces generated to move s sighting device, means connected to said sight device and to said connecting means to cont the force applied to said sighting device in cordance with the angular position of said sig ing device so as to maintain said sighting dev on a target, means for introducing a correct for time of flight of said projectile into said sp measuring mechanism so as to determine target's total motion during said time of fli and means operated responsively to the ope tion of said speed measuring means so as utilize the value of the target's total motion t] measured for generating the range angle of s bomb.

18. In sighting mechanism for dropping bor and the like from airplanes and like aircraft sighting device arranged to be directed on target, resilient means, lever mechanism opera connected with said resilient means so as to operated by said resilient means, means co trolled by said lever mechanism for moving s sighting device in accordance with the operat of said lever mechanism by said resilient mea means for adjusting said resilient means so as vary the resulting controlling effects thereof the motion of said line of sight, means connect said lever mechanism with said means moving said sighting device to control autom: cally the leverage of said lever mechanism accordance with the angular position of s sighting device and means connecting said le mechanism with said resilient means to cont automatically the leverage of said lever mec nism in accordance with the adjustments of s resilient means so that said line of sight is direc on a target having an apparent constant lin velocity, the adjustments of said resilient me being a measure of the velocity of said tar and means for adjusting said lever mechan in accordance with a function of the time of fli of a bomb released from said airplane so t the adjustments of said resilient means ar measure of the target's total motion during interval of time measured by the time of fli of said bomb.

19. Sighting mechanism for dropping bor and the like from airplanes and like airci comprising mechanism for measuring the inst taneous values of the apparent linear velocit a target and like object including means adju able in accordance with the apparent lin velocity of said target, means operably associa with said mechanism for introducing a funct of the time of flight of a bomb released from s airplane so that the settings of said adjusts means measure the target's total motion du the interval of time measured by said time flight, differential mechanism connected v said adjustable means so as to be operated accordance with its settings arranged to gene1 the range angle of said bomb, means for meas ing continuously the angular position of s target, means connecting said measuring me with said differential mechanism to operate s differential mechanism to generate said angi position, and an output member of said dif ential mechanism operated by said mechan to generate the difference in magnitude betw said angular position and said range angle.

20. In sighting mechanism for dropping a p jectile on a target from airplanes and like craft, means for measuring the instantane values of the fore and aft and athwartship apparent velocity components of said target, means including mechanism operably associated with said velocity measuring means for generating mechanically the fore and aft and athwartship angular coordinates of the range angle of a bomb released from said airplane, said coordinates being reckoned with reference to a vertical at said airplane and means for measuring continuously the angular coordinates of the target's position taken with reference to a vertical at said airplane and for comparing continuously the values of said latter coordinates with the calculated values of the coordinates of said range angle.

21. Sighting mechanism for directing a projectile on a target comprising a sighting device, target speed measuring means including force generating means operably associated with said sighting device so that the generated force moves said sighting device, means operated responsively to the position of said sighting device continuously controlling the application of said force generated so as to maintain said sighting device on a target, means for introducing a correction for time of flight of said projectile into said speed measuring mechanism so as to determine the target's total motion during said time of flight, means operated responsively to the operation of said speed measuring means so as to utilize the value of the target's total motion thus measured for generating the range angle of said bomb, and means for mechanically measuring continuously the angular position of said target with respect to said airplane and for comparing continuously the magnitude of said positional angle and said range angle.

22. Sighting mechanism for dropping bombs and the like from airplanes and like aircraft comprising means for measuring the instantaneous values of the apparent linear velocity of a target and like object including a sight, adjustable resilient means for generating forces to move said sight, means operably connecting said resilient means with said sight so as to apply said forces to move said sight, means automatically responsive to the position of said sight controlling said connecting means between said resilient means and said sight so as to maintain said sight on said target, means operably associated with said velocity measuring means for introducing into said mechanism a function of the time of flight of a bomb released from said airplane so that the settings of said adjustable resilient means measure the target's total motion during the interval of time measured by said time of flight, means for locating "the point of impact" of said bomb with respect to said airplane, and means operated responsively to the operation of said latter means in determining said point of impact and to the operation of said velocity measuring means in measuring said target's total motion for calculating the range angle of said bomb.

23. Sighting mechanism for directing a projectile on a target comprising a sighting device, target speed measuring means including force generating means operably associated with said sighting device so that the generated force moves said sighting device, means automatically responsive to the position of said sighting device continuously controlling the application of said force generated so as to maintain said sighting device on a target, means for introducing a correction for time of flight of said projectile into said speed measuring mechanism so as to determine the target's total motion during said time of flight, means operated responsively to the operation of said speed measuring means so to utilize the value of the target's total motion thus measured for generating the range angle of said bomb, and means for mechanically measuring the angular position of said target with respect to said airplane and for comparing continuously the magnitude of said positional angle and said range angle.

24. Sighting mechanism for directing a projectile on a target comprising a sighting device, speed measuring means for operating said sighting device, motion transmitting means between said operating means and said sighting device, control means connected with said sighting device and said motion transmitting means controlling the operation of said transmitting means to move said sighting device to maintain it on a target, means for introducing a correction for time of flight of said projectile into said speed measuring means so as to determine the target's total motion during said time of flight, means for locating "the point of impact" of said bomb with respect to said airplane, and means operated responsively to the operation of said latter means in determining said "point of impact" and to the operation of said velocity measuring means to measure said target's total motion for calculating the range angle of said bomb.

25. Sighting mechanism for dropping bombs and the like from airplanes and like aircraft comprising means for measuring the value of the speed of a target and like object having an apparent constant linear velocity including mechanism adjustable in accordance with the value of said speed, means for introducing into said mechanism a function of the time of flight of a bomb released from said airplane in terms of the altitude and air speed of said airplane so that the adjustments of said mechanism measure the target's total motion during the interval of time measured by said time of flight, means for calculating the "trail" angle of said bomb as a function of said angle, means operable responsively to said adjustable mechanism and said "trail" angle calculating means for calculating mechanically the coordinates of the range angle of said bomb reckoned with reference to a vertical at said airplane and means for measuring continuously the angular coordinates of the target's position reckoned with reference to a vertical at said airplane and for comparing continuously the values of said latter coordinates with the calculated values of the coordinates of said range angle.

26. Sighting mechanism for dropping bombs and the like from airplanes and like aircraft comprising a sighting device arranged for angular motion about an axis arranged fore and aft and a second axis movable in a plane athwartship, a gyroscope arranged to precess about axes arranged parallel to said axes of said sighting device, a driving connection between said gyroscope and said sighting device whereby the motion of the line of sight of said sighting device is controlled by the precession of said gyroscope, a pair of springs for applying precessing torques to axes of said gyroscope, means including lever mechanisms interposed between said springs and said last named axes for transmitting the forces generated by said springs to precess said gyroscope about its first named axes, means for controlling said lever mechanisms in accordance with the angular positions of said gyroscope on its axes so that the settings of said springs are measures of the fore and aft and athwartship velocity components respectively of a target having a substantially constant apparent linear velocity, means for calculating mechanically the time of flight of a bomb released from said airplane in terms of the altitude and the air speed of said airplane, means for controlling said lever mechanisms in accordance with a function of the time of flight thus calculated so that the force generated by one of said springs in keeping said sight on said target fore and aft is a measure of a function of the range angle forward plus a function of the "trail" angle of said bomb, while the force generated by the other of said springs in keeping said sight on said target athwartship is a measure of the corresponding function of the range angle athwartship, means for calculating mechanically the corresponding function of said "trail" angle in terms of the altitude and air speed of said airplane, a differential gear arrangement controlled in accordance with the said measured aggregate of functions of angles fore and aft and "trail" and with the calculated function of said "trail" angle so that the output of said differential gear arrangement measures the value of the corresponding function of the range angle fore and aft, means controlled by the angular position of said gyroscope on its fore and aft and athwartship axes for measuring continuously the corresponding functions of the angular coordinates of the target's position with respect to said airplane, and differential gear arrangements controlled in accordance with the measured values of the function of the range angles fore and aft and athwartship respectively and the functions of the said angular coordinates of the target's position for mechanically comparing the values of the said functions of said range angles with the corresponding functions of said angular coordinates of the position of the target relative to said airplane.

27. Sighting mechanism for directing a projectile on a target comprising a sighting device, speed measuring means including means for generating a force and means for transmitting said force generated and applying it to said sighting device for moving said sighting device, means connected with said sighting device and with said force transmitting means controlling the operation of said force transmitting means as the position of said sighting device is changed to control continuously the application of said force to said sighting device so as to maintain said sighting device on a target having a substantially constant apparent linear velocity, means for introducing a correction for time of flight of said projectile into said speed measuring mechanism so as to determine the target's total motion during said time of flight, means operated responsively to the operation of said speed measuring means so as to utilize the value of the target's total motion thus measured for generating the range angle of said bomb, means for mechanically measuring continuously the angular position of said target with respect to said airplane and for comparing continuously the magnitudes of said positional angle and said range angle and means operated responsively to the operation of said last mentioned means for effecting the automatic release of said projectile when the magnitudes of these angles have become substantially equal.

28. In sighting mechanism for dropping projectiles from airplanes and like aircraft, mechanism for measuring the instantaneous values of the apparent linear velocity of a target and li object including a sighting device, force ge erating means for moving said sighting devi adjustable in accordance with the apparent line velocity of said target and responsive to the po tion of said sighting device so that constant a justments of said means correspond to consta apparent speeds of said target, means for co trolling said velocity measuring mechanism in a cordance with a function of the time of flight a projectile released from said airplane so th said constant adjustments of said force genere ing means measure the target's total motion du ing the interval of time measured by the flight said projectile mechanism operably associat with said velocity measuring mechanism so as utilize the value of the said target's total moti thus measured for calculating mechanically t range angle of said projectile, means for mecha ically measuring continuously the angular po tion of said target with respect to said airpla and for comparing continuously the magnituc of said positional angle and said range angle, a means responsive to the operation of said la mentioned means for effecting the automatic 1 lease of said projectile when the magnitudes these angles have become substantially equal.

29. In sighting mechanism for dropping bom and the like from airplanes and like aircraft sighting device arranged to be directed on target and like object, a gyroscope arranged i precession about a pair of axes arranged fc and aft and in a plane athwartship respective a driving connection between said gyroscope a said sighting device whereby the motion of t line of sight of said sighting device is maintain substantially parallel with the spin axis of sa gyroscope and is controlled by the precession said gyroscope about its axes, means for calcula ing the time of flight of a bomb released fro said airplane in terms of the altitude and the speed of said airplane, means for applying pi cessing torques to axes of said gyroscope in a cordance with the fore and aft and athwartsl velocity components of a target having an a parent constant linear velocity including a p of spring members and means including lev mechanisms adjusted in accordance with sa calculated value of the time of flight of said bo for transmitting the forces generated by one said spring members to precess said gyrosco about its fore and aft axis and for transmitti the force generated by said other spring me ber to precess said gyroscope about its axis mo able in a plane athwartship, means responsive the angular position of said gyroscope on axes for controlling said lever mechanisms that a constant setting in the force generated said one spring member in keeping said sight said target fore and aft is proportional to and a measure of the quantity: tangent range an fore and aft plus tangent "trail" angle, while constant setting in the force generated by sa other spring member in keeping said sight said target athwartship is proportional to a is a measure of the quantity: tangent rar angle athwartship, means for calculating n chanically the value of the tangent function said "trail" angle, a differential gear having t input shafts and one output shaft, one of sa input shafts being controlled to move in accor ance with the setting of said one spring meml and the other being controlled to move in a cordance with the calculated value of the tange function of the "trail" angle so that said outj shaft measures the quantity: tangent range angle fore and aft, a second differential having two input shafts and one output shaft, one of said input shafts being the output shaft of the said first differential and the other input shaft being controlled to move in accordance with the angular position of said gyroscope on an axis athwartship so as to measure continuously the tangent function of the fore and aft coordinate of the target's position with respect to said airplane measured with respect to a vertical at said airplane, said second differential being arranged so that its output shaft measures continuously the difference in the magnitudes of the tangents of the said angular coordinate and the range angle fore and aft, a third similar differential, one input shaft of said third differential being controlled to move in accordance with the setting of said athwartship spring member, and the other input shaft being controlled to move in accordance with the angular position of said gyroscope on its fore and aft axis so as to measure continuously the tangent of the angular coordinate of the target's position athwartship measured with respect to a vertical at said airplane, said third differential being arranged so that its output shaft measures continuously the difference in magnitudes of the tangents of said athwartship angular coordinate and the range angle athwartship, a bomb releasing circuit, and switch mechanism controlled by said second and third differentials for controlling said releasing circuit so as to effect the energization thereof when by the progress of the battle action the fore and aft and athwartship angular coordinates of the target's angular position with respect to said airplane have become substantially equal at the same instant of time to the range angles fore and aft and athwartship respectively.

30. In sighting mechanism and the like, a sighting device arranged to be directed on a target and like object, means for generating a force and for applying it to move said sighting device to maintain it on a target, means automatically responsive to the position of said sighting device controlling the application of said force to said sighting device so that constant forces generated correspond to constant linear velocities of said target and means including mechanism operated responsively to the position of said sighting device for measuring the instantaneous magnitudes of the target's bearing with reference to a predetermined axis.

31. A sighting device arranged to be directed on a target and like object, means for generating a force and for applying it to move said sighting device to maintain it on a target, means automatically responsive to the position of said sighting device controlling the application of said force to said sighting device so that constant forces generated correspond to constant linear velocities of said target, means including mechanism operated responsively to the position of said sighting device for measuring the instantaneous magnitudes of said target's bearing with reference to a predetermined axis, means operated responsively to the operation of said force generating means in operating to maintain said sighting device on said target so as to measure the apparent direction of motion of said target with respect to the same predetermined axis and means controlled by both of said measuring means for comparing continuously the values of said bearing and said apparent direction of motion measured with reference to said predetermined axis.

32. Projectile dropping apparatus for airplanes and like aircraft comprising means for establishing "the point of impact" of a projectile released from said airplane measured with respect to said airplane, means for measuring the bearing of a target and like object operable responsively to the operation of said first named means so as to measure said bearing with respect to a predetermined reference axis passing through "the point of impact," means for determining the apparent direction of motion of said target with respect to said reference axis and means operated responsively to the operation of said last named means and to that of said bearing measuring means for comparing continuously the magnitudes of said bearing and said apparent direction of motion measured with respect to said reference axis.

33. In sighting mechanism and the like, a sighting device arranged to be directed on a target and like object, means for moving said sighting device to maintain it directed on said target, means including mechanism operated responsively to the position of said sighting device for measuring the instantaneous magnitudes of the target's bearing with reference to a predetermined axis, means operated responsively to the operation of said means for moving said sighting device so as to measure the apparent direction of motion of said target with respect to the same predetermined axis and means controlled by both of said measuring means for comparing continuously the values of said bearing and said apparent direction of motion measured with reference to said predetermined axis.

34. In sighting mechanism and the like, a sighting device arranged to be directed on a target and like object, means for generating a force and for applying it to move said sighting device so as to maintain it directed on said target and means operated responsively to the operation of said force generating means in operating to generate a force to maintain said sighting device on said target for measuring the apparent direction of motion of said target with reference to a predetermined axis.

35. In sighting mechanism and the like for airplanes and like aircraft, a sighting device arranged to be directed on a target and like object, spring means for applying a force to move said sighting device, means operated responsively to the position of said sighting device controlling the force generated by said spring means so as to maintain said sighting device directed on a target, means including mechanism operated responsively to the position of said sighting device for measuring the instantaneous magnitudes of the target's bearing with respect to a predetermined point on a predetermined reference axis, means operated responsively to the operation of said spring means in accordance with the force generated thereby to maintain said sighting device on said target so as to measure the direction angle of the path of apparent motion of said target reckoned with respect to said reference axis and means for indicating continuously the difference in magnitudes of said bearing and said direction angle.

36. In sighting mechanism for dropping bombs and the like from airplanes and like aircraft, a sighting device on said airplane arranged to be directed on a target, means for moving said sighting device in accordance with the apparent motion of said target so as to maintain it directed on said target, speed measuring means adjustable in accordance with the apparent velocity of said target, means including mechanism operated responsively to the position of said sighting device for measuring the instantaneous values of the bearing of said target measured with reference to a predetermined axis, means including mechanism operated responsively to the adjustment of said speed measuring means for measuring the instantaneous magnitudes of the direction angle of the apparent path of motion of said target with respect to said predetermined axis and mechanism operated responsively to the operation of said bearing and said direction measuring means for continuously comparing the magnitudes of said bearing and said direction angle.

37. In sighting mechanism and the like for airplanes and like aircraft, a sighting device, a gyroscope connected to move said sighting device by the precession of said gyroscope, means for applying a measured precessing torque to said gyroscope in accordance with the apparent linear motion of a target and like object so that said sighting device is maintained directed on said target, mechanism including means dependent upon the position of said sighting device for measuring the instantaneous magnitudes of the bearing of said target with respect to a predetermined axis of reference, means dependent upon the operation of said torque applying means for measuring the instantaneous magnitudes of the direction angle of the apparent course of said target with respect to said predetermined axis of reference and means for continuously comparing the magnitudes of said bearing and said direction angle.

38. In projectile dropping mechanism and the like for airplanes and like aircraft, means for measuring the instantaneous magnitudes of the apparent linear velocity components of a target and like object measured with respect to predetermined reference axes, means for measuring the components of the target's distance from said airplane measured with respect to said reference axes, means responsive to the operation of said velocity component measuring means for continuously measuring a quotient of said velocity components so as to determine the instantaneous magnitudes of the direction angle of the apparent course of said target measured with respect to one of said axes, means responsive to the operation of said distance component measuring means for measuring a quotient of said distance components so as to determine the instantaneous magnitudes of the bearing of said target with respect to said one axis, and means operably associated with both of said quotient measuring means for continuously comparing the value of said quotients.

39. In sighting mechanism for dropping bombs and the like from airplanes and like aircraft, means for establishing "the point of impact" of a bomb released from said airplane measured with reference to said airplane, a sighting device on said airplane arranged to be directed on a target, means for moving said sighting device in accordance with the apparent motion of said target so as to maintain it directed on said target, speed measuring means adjustable in accordance with the apparent velocity of said target, means including mechanism responsive to the position of said sighting device for measuring the instantaneous values of the bearing of said target measured with reference to a predetermined axis passing through "the point of impact," means including mechanism operated responsively to the operation of said speed measuring means when adjusted in accordance with the apparent velocity of said target for measuring the instantaneous magnitudes of the direction angle of the apparent path of motion of said target with respect to said predetermined axis, mechanism operated responsively to the operation of said bearing and said direction measuring means for continuously comparing the magnitudes of said bearing and said direction angle and for indicating the outstanding difference between these angles.

40. In projectile dropping mechanism and the like for airplanes and like aircraft, means for establishing "the point of impact" of a projectile released from said airplane measured with reference to said airplane, means for measuring the instantaneous values of the fore and aft and athwartship components of the distance of the target from "the point of impact" so as to determine the instantaneous magnitudes of the bearing of said target measured from "the point of impact" and with reference to the fore and aft axis, means for measuring the instantaneous magnitudes of the direction angle of the apparent course of said target measured with reference to the fore and aft axis of said airplane and mechanism responsive to the operation of said distance and direction angle measuring means for continuously indicating their outstanding difference.

41. In sighting mechanism for dropping bombs and the like from airplanes and like aircraft, sighting device arranged to be directed on a target and like object, a gyroscope mounted to precess about axes arranged fore and aft and generally athwartship, operable connections between said gyroscope and said sighting device whereby said sighting device is moved by the precession of said gyroscope, mechanism for generating substantially constant forces, means for adjusting said mechanism so as to control the constant forces generated thereby, means for transmitting said constant forces and for applying them to fore and aft and athwartship axes of said gyroscope in accordance with the apparent linear velocity of a target so as to maintain said sighting device directed on said target, the constant forces transmitted to said axes being measures of the target's apparent velocity components athwartship and fore and aft respectively, means for determining the "trail" of a bomb released from said airplane measured with respect to said airplane on the fore and aft axis so as to locate "the point of impact" of said bomb, means responsive to the angular position of said gyroscope on its axes and utilizing the determined value of "trail" for calculating mechanically the instantaneous magnitudes of the bearing of said target measured from "the point of impact" with reference to the fore and aft axis, means dependent upon the adjustments of said force generating means for measuring the instantaneous magnitudes of the direction angle of the apparent course of said target measured with rspect to said fore and aft axis, and means for continuously comparing the instantaneous magnitudes of said bearing and said direction angle and for indicating their outstanding difference.

42. In sighting mechanism for airplanes and like aircraft, a sighting device arranged to be directed on a target and like object, means for measuring the instantaneous magnitudes of the apparent velocity components of said target measured with reference to the fore and aft and athwartship axes of said airplane including mechanism for moving said sighting device in accordance with the said apparent motion of said target so as to maintain said sighting device directed on said target, means including a member operably associated with said sighting device so as to be actuated in accordance with the position of said sighting device to measure continuously the bearing of said target measured with reference to said fore and aft axis, means including a second member operably associated with said velocity measuring means so as to be actuated in accordance with the measured apparent velocity components of said target to measure continuously the direction angle of the apparent course of said target with respect to said fore and aft axis and means associated with said member for comparing their motions continuously.

43. In sighting mechanism and the like for airplanes and like aircraft, a sighting device arranged to be directed on a target and like object, a gyroscope arranged for precession about axes arranged fore and aft and generally athwartship, operable connections between said sighting device and said gyroscope whereby said sighting device is moved about axes arranged fore and aft and generally athwartship by the precession of said gyroscope about its axes, measuring means for applying measured precessing torques to said gyroscope about axes fore and aft and athwartship for causing said gyroscope to precess in accordance with the apparent linear velocity components of motion of said target measured with reference to said fore and aft and athwartship axes, said mechanism including means adjustable in accordance with said velocity components, a member, means pivotally mounting said member for movement about a fixed axis, a second member, means pivotally mounting said second member for movement about a fixed axis in axial alignment with said first axis, means responsive to the angular position of said gyroscope on its axes for measuring continuously the tangent functions of the angular coordinates of the target's position from said airplane, means for calculating the tangent function of the "trail" angle of a bomb released from said airplane measured with respect to said airplane, means utilizing said measured functions for moving said first pivotally mounted member so that its vertical projection measures the tangent function of the athwartship component of said angular position of said target, while its horizontal projection measures the tangent function of the fore and aft angular component of said target's position plus the tangent function of said "trail" angle, means for moving said second pivotally mounted member in accordance with the settings of said torque measuring means so that its vertical projection measures the athwartship velocity component of said target, while its horizontal projection measures the apparent fore and aft velocity component of said target and means for continuously measuring the outstanding differences in the angles assumed by said first and second members about their fixed pivots.

44. Projectile dropping apparatus for airplanes and the like comprising means for measuring the speed of a target, means for generating the bearing of said target, means for generating the apparent direction of motion of said target, means operated responsively both to the operation of said bearing generating means and said means for generating the apparent direction of motion of said target for determining a collision course for said airplane and means operated responsively to the operation of said speed measuring means for determining a point in said course from which a hit can be scored.

45. Sighting mechanism for dropping projectiles from airplanes and the like comprising a sighting device, a gyroscope connected to said sighting device, means for applying a force to said gyroscope to cause said gyroscope to precess so as to maintain said sighting device on a target, mechanism responsive to said precessional force and precessional movement for determining a collision course and a point in said course from which a hit can be made and means for modifying the operation of said mechanism in accordance with the altitude and airspeed of said airplane.

46. Projectile dropping apparatus for airplanes and the like comprising means for measuring the speed of a target, means for generating the bearing of said target, means for generating the apparent direction of motion of said target, means operated responsively both to the operation of said bearing generating means and said means for generating the apparent direction of motion of said target for determining a collision course for said airplane, means operated responsively to the operation of said speed measuring means for determining a point in said course from which a hit can be scored and a pilot indicator operated responsively to the operation of said means for generating said target's bearing and further, to the operation of said means for generating said apparent direction of motion of said target.

47. Projectile dropping apparatus for airplanes and the like comprising means for measuring the speed of a target, means for generating the bearing of said target, means for generating the apparent direction of motion of said target, means operated responsively both to the operations of said bearing generating means and means for generating the apparent direction of motion of said target for determining the collision course for said airplane, means operated responsively to the operation of said speed measuring means for determining a point in said course from which a hit can be scored and means operated responsively to the operation of said last named means for effecting automatic delease of said projectile when said airplane arrives at said point.

48. Sighting mechanism for dropping projectiles and the like from airplanes and like aircraft comprising a sighting device, means for generating forces to move said sighting device, means operably associated with said sighting device and said force generating means for transmitting forces from said generating means to move said sighting device, means automatically responsive to the position of said sighting device controlling said force transmitting means so that said sighting device is moved to maintain it on a target and means operated responsively to said force generating means and to the movement of said sighting device for determining a collision course for said airplane and a point in said course from which a hit can be scored.

49. Sighting mechanism for dropping projectiles from airplanes and the like comprising a sighting device, a gyroscope operably connected to said sighting device, means for applying a force to said gyroscope to cause said gyroscope to precess so as to maintain said sighting device on a target, mechanism responsive to said precessional force and said precessional movement for determining a collision course for said airplane and a point in said course from which a hit can be scored, a pilot course indicator responsive to the operation of said mechanism and means responsive to the precessional force and said precessional movement for effecting automatic release of said projectile when said airplane arrives at said point.

50. In sighting mechanism for airplanes and like aircraft bombing apparatus, means for measuring the instantaneous values of the apparent velocity of a target and like object, mechanism responsive to the operation of said velocity measuring means for calculating the direction angle of the apparent course of said target measured with reference to a predetermined axis, mechanism for determining the bearing of said target with reference to said predetermined axis, means operably associated with said direction angle and said bearing calculating mechanism for comparing the magnitudes of said direction angle and said bearing so that said airplane can be directed on a course in accordance with the apparent course of said target and means including mechanism operable responsively to said velocity measuring means for calculating the range angle of a bomb released from said airplane.

51. Sighting mechanism for airplane and like aircraft bombing apparatus comprising means for measuring the value of the speed of a target and like object having constant apparent linear velocity including mechanism adjustable in accordance with the value of said speed, means for introducing into said mechanism a function of the time of flight of a bomb released from said airplane in terms of the altitude and air speed of said airplane so that the adjustments of said mechanism measure the target's total motion during the interval of time measured by said time of flight, means for calculating the "trail" angle of said bomb so as to locate "the point of impact" of said bomb with reference to said airplane, means operably associated with said speed measuring means for measuring continuously the angular coordinates of the target's position reckoned with reference to a vertical at said airplane and with reference to predetermined axes, one of which includes "the point of impact", means responsive to the operation of said "trail" angle calculating means and the operation of said angular coordinate measuring means for measuring continuously the bearing of said target measured from "the point of impact" with reference to said one axis, means operated responsively to the adjustments of said velocity measuring mechanism for calculating mechanically and continuously the magnitude of the direction angle of the apparent course of said target measured with reference to said one axis, pilot directing mechanism responsive to the operation of said means for measuring said bearing and direction angle of said target so that said airplane can be directed to carry "the point of impact" on the apparent course of said target, means responsive to said velocity measuring means and the operation of said "trail" angle calculating means so as to utilize the measured value of the target's total motion during the time of flight of said bomb and the calculated value of said "trail" angle for calculating mechanically the coordinates of the range angle of said bomb reckoned with reference to a vertical at said airplane and said predetermined axes and means responsive to said latter means and said means for measuring the angular coordinates of said target for comparing continuously the values of said coordinates with the calculated values of the angular coordinates of said target's position with respect to said airplane.

52. In sighting mechanism and the like for airplane and like aircraft bombing apparatus, a sighting device arranged for angular movement about axes arranged fore and aft and athwartship respectively so that it can be directed on a target and like object, operating means for moving said sighting device about said axes to maintain it directed on a target having a constant apparent linear velocity including means for generating measured forces to be applied to said axes to impart angular motion to said sighting device and means dependent upon the angular position of said sighting device on said axes for controlling the application of said measured forces so that said sighting device is maintained on said target and said forces are measures of the fore and aft and athwartship velocity components respectively of said target, means for calculating mechanically the time of flight of a bomb released from said airplane in terms of the altitude and air speed of said airplane, mechanism operably associated with said operating means and said time of flight calculating means for controlling said forces applied to impart angular motion to said sighting device in accordance with a function of the time of flight calculated so that said measured forces are proportional to and measure the total motion of the target during the interval of time measured by the time of flight of said bomb, means for calculating a function of the "trail" angle of said bomb so as to determine "the point of impact" of said bomb measured with respect to said airplane, mechanism including means responsive to the position of said sighting device about its axes for computing continuously corresponding functions of the angular coordinates of the target's position with respect to said airplane, means dependent upon the operation of said last mentioned means and upon the operation of said means for calculating a function of said "trail" angle for measuring continuously the instantaneous magnitudes of the bearing of said target measured from "the point of impact" with respect to the fore and aft axis, means responsive to the operation of said force generating means in measuring said velocity components of said target for computing continuously the instantaneous magnitudes of the direction angle of the apparent course of said target measured with reference to said fore and aft axis, mechanism responsive to the operation of said bearing and said direction angle measuring means for comparing continuously the instantaneous values of the bearing of said target and the direction angle of its course and for indicating the outstanding difference between them whereby said airplane can be directed to take such a course that "the point of impact" will be directed in the apparent course of said target, means including mechanism responsive to said force generating means so as to utilize the measured value of the target's total motion during the time of flight of said bomb for calculating mechanically the fore and aft and athwartship coordinates of the range angle of said bomb, means responsive to the operation of said last mentioned means and said means for computing functions of the angular coordinates of said target position for continuously comparing the magnitudes of said range angle angular coordinates with the magnitudes of the calculated coordinates of the target's position with respect to said airplane and means responsive to the operation of said angular coordinate comparing means for effecting the automatic release of said bomb when the magnitudes of said angular coordinates become substantially equal respectively with each other.

53. Apparatus for controlling the discharge of projectiles, comprising a gyroscope, settable automatic means to apply torques to said gyroscope about two axes at right angles to each other, mechanism controlled by said gyroscope, and operating connections between said gyroscope and said mechanism whereby said mechanism is automatically moved in mutually perpendicular planes by said gyroscope.

54. Apparatus for controlling the discharge of projectiles, comprising a gyroscope, adjustable automatic means to apply predetermined torques to said gyroscope about two axes at right angles to each other to precess the same in two mutually perpendicular planes, mechanism controlled by said gyroscope and instrumentalities connecting said gyroscope to said mechanism and electric controls operated by said gyroscope to actuate said mechanism.

55. Apparatus for controlling the discharge of projectiles, comprising a gyroscope, adjustable automatic means to precess said gyroscope in two mutually perpendicular planes, directional mechanism means controlled by said gyroscope to move said mechanism in two planes as aforesaid to direct the same at a target, and means to act on said precessing means in accordance with changes in relative motion between said apparatus and said target.

56. Apparatus for controlling the discharge of projectiles comprising a gyroscope, means settable to precess automatically said gyroscope corresponding to relative movements of a target in two mutually perpendicular planes, mechanism operated in two mutually perpendicular planes by said gyroscope, means to generate forces proportional to said movements and means to act on said precessing means in accordance therewith.

57. A sighting device tiltable about fore-and-aft and athwartship axes, a gyroscope connected to move said device about said axes, and means to apply to said gyroscope measured torques to control the precession of said gyroscope to such a rate as to keep said device trained on a target.

WALDO W. WILLARD.

Certificate of Correction

Patent No. 2,408,356.

September 24, 1946.

WALDO W. WILLARD

It is hereby certified that errors appear in the printed specification of the above numbered patent requiring correction as follows: Column 2, line 53, for "oustanding" read *outstanding*; column 23, line 58, for "$\beta$ movements of the shaft" read *tan $\beta$ movements of the shafts*; column 34, line 38, for "travel of" read *travel if*; column 38, line 18, for "diret" read *direct*; column 40, line 13, for "velocty" read *velocity*; column 45, line 63, beginning with "16. Sighting mechanism" strike out all to and including "flight." in line 72, same column; column 47, line 15, beginning with "21. Sighting mechanism" strike out all to and including "angle." in line 36, same column; for the claims now numbered "17," "18," "19" and "20" read 16, 17, 18 and 19 and for the claims appearing as 22 to 57 inclusive read 20 to 55 respectively; column 54, line 69, for "rspect" read *respect*; column 56, line 55, for "delease" read *release*; in the heading to the printed specification, line 7, for "57 Claims" read *55 Claims*; and that the said Letters Patent should be read with these corrections therein that the same may conform to the record of the case in the Patent Office.

Signed and sealed this 8th day of July, A. D. 1947.

[SEAL]

LESLIE FRAZER,
*First Assistant Commissioner of Patents.*